US011226630B2

(12) United States Patent
Viswanathan et al.

(10) Patent No.: US 11,226,630 B2
(45) Date of Patent: Jan. 18, 2022

(54) METHOD AND APPARATUS FOR ESTIMATING A LOCALIZED POSITION ON A MAP

(71) Applicant: HERE GLOBAL B.V., Eindhoven (NL)

(72) Inventors: Anirudh Viswanathan, Berkeley, CA (US); Matt Mott, Berkeley, CA (US)

(73) Assignee: HERE Global B.V., Eindhoven (NL)

( * ) Notice: Subject to any disclaimer, the term of this patent is extended or adjusted under 35 U.S.C. 154(b) by 84 days.

(21) Appl. No.: 16/209,549

(22) Filed: Dec. 4, 2018

(65) Prior Publication Data
US 2020/0174487 A1 Jun. 4, 2020

(51) Int. Cl.
*G05D 1/02* (2020.01)
*G01C 21/16* (2006.01)
*G05D 1/00* (2006.01)

(52) U.S. Cl.
CPC ......... *G05D 1/0221* (2013.01); *G01C 21/165* (2013.01); *G05D 1/0088* (2013.01); *G05D 1/0274* (2013.01); *G05D 2201/0213* (2013.01)

(58) Field of Classification Search
CPC ...... G01C 21/165; G01C 21/30; G01C 21/28; G01C 21/26; G01C 21/005; G01C 21/32; G01S 19/40; G01S 19/45; G01S 17/42; G01S 19/49; G01S 19/51; G06K 9/00798; G05D 1/0221; G05D 1/0212; B60W 30/12
See application file for complete search history.

(56) References Cited

U.S. PATENT DOCUMENTS

| 8,775,006 | B2 | 7/2014 | Moshchuk et al. |
| 9,199,643 | B1* | 12/2015 | Zeng ..................... G01S 13/726 |
| 9,459,625 | B1* | 10/2016 | Ferguson .............. B60W 40/04 |
| 9,888,364 | B2 | 2/2018 | Uliyar et al. |
| 2018/0267172 | A1 | 9/2018 | Oh et al. |

(Continued)

FOREIGN PATENT DOCUMENTS

EP 2450763 B1 3/2017

OTHER PUBLICATIONS

Office Action for related European Patent Application No. 19213178. 7-1001, dated Apr. 30, 2020, 5 pages.

(Continued)

*Primary Examiner* — Kenneth J Malkowski
(74) *Attorney, Agent, or Firm* — Ditthavong, Steiner & Mlotkowski

(57) ABSTRACT

An approach is provided for localizing a vehicle pose on a map. The approach involves, receiving an input specifying the vehicle pose with respect to a road lane of the map. The approach also involves searching over a set of candidate lateral offsets to select a lateral offset that minimizes a lateral error between the vehicle position with the lateral offset applied and a lateral location of the road lane, wherein the lateral location and the travel direction of the lane are determined from the map. The approach further involves searching over a set of candidate vehicle headings at the selected lateral offset to select a vehicle heading that minimizes a heading error. The approach further involves determining a local optimum of the vehicle pose based on the selected lateral offset and vehicle heading, wherein the vehicle pose is localized to the map based on the local optimum.

20 Claims, 18 Drawing Sheets

(56) References Cited

U.S. PATENT DOCUMENTS

2019/0361450 A1* 11/2019 Sheckells .............. B60W 30/10
2019/0391268 A1* 12/2019 Houts .................... G05D 1/024
2020/0033855 A1* 1/2020 Daily ................... G05D 1/0212

OTHER PUBLICATIONS

Kuhnt et al., "Lane-precise Localization of Intelligent Vehicles Using the Surrounding Object Constellation," Published 2016 in 2016 IEEE 19th International Conference on Intelligent Transportation Systems (ITSC), 8 pages.

Kumar et al., "Efficient Parametric Signal Estimation From Samples with Location Errors," Published in: IEEE Transactions on Signal Processing, vol. 61, Issue 21, Nov. 1, 2013, pp. 5285-5297.

Huang et al., "An Expectation-maximization-based Interacting Multiple Model Approach for Cooperative Driving Systems," Published in IEEE Transactions on Intelligent Transportation Systems, vol. 6 Issue 2, Jun. 2005 pp. 206-228.

* cited by examiner

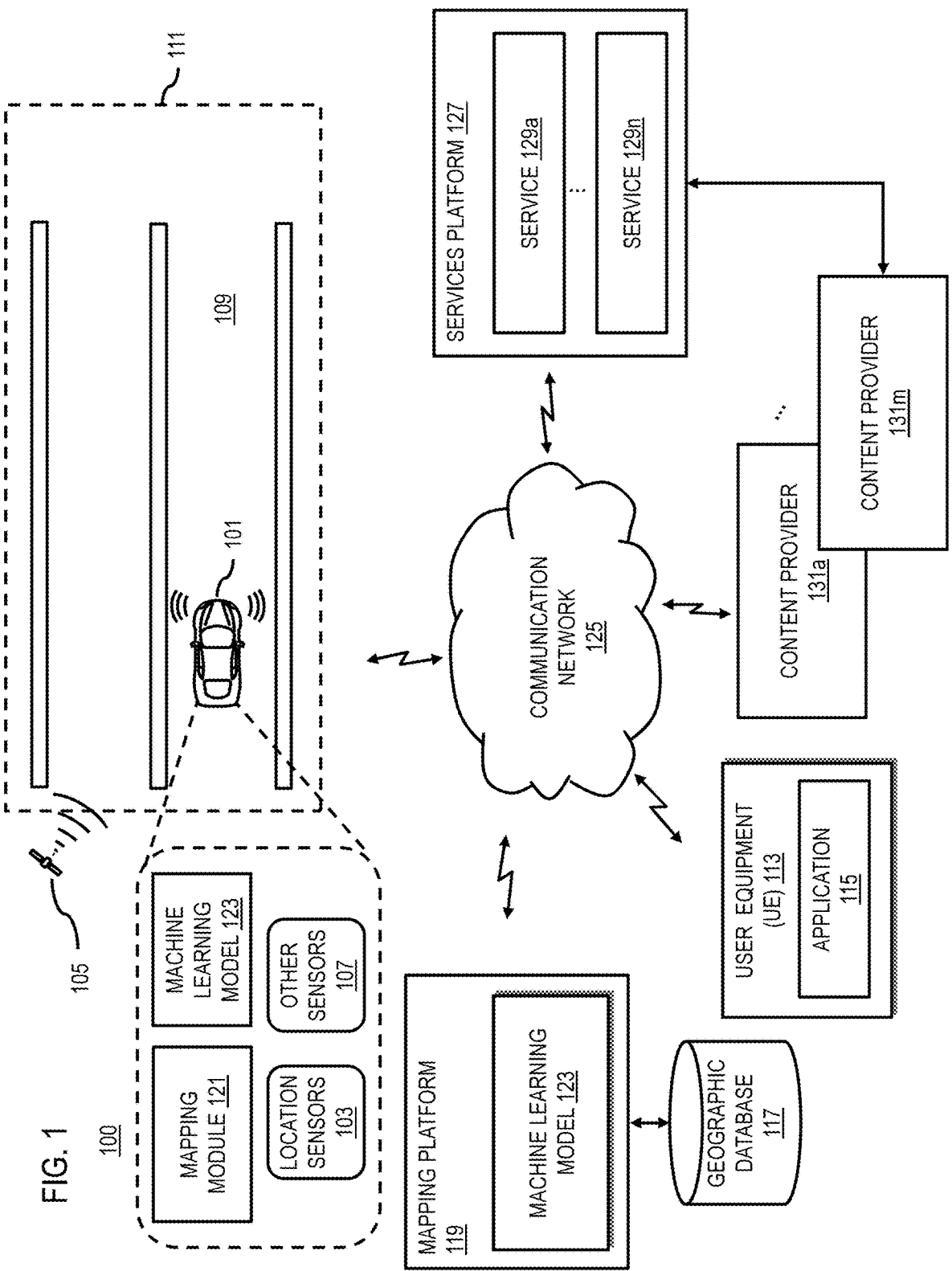

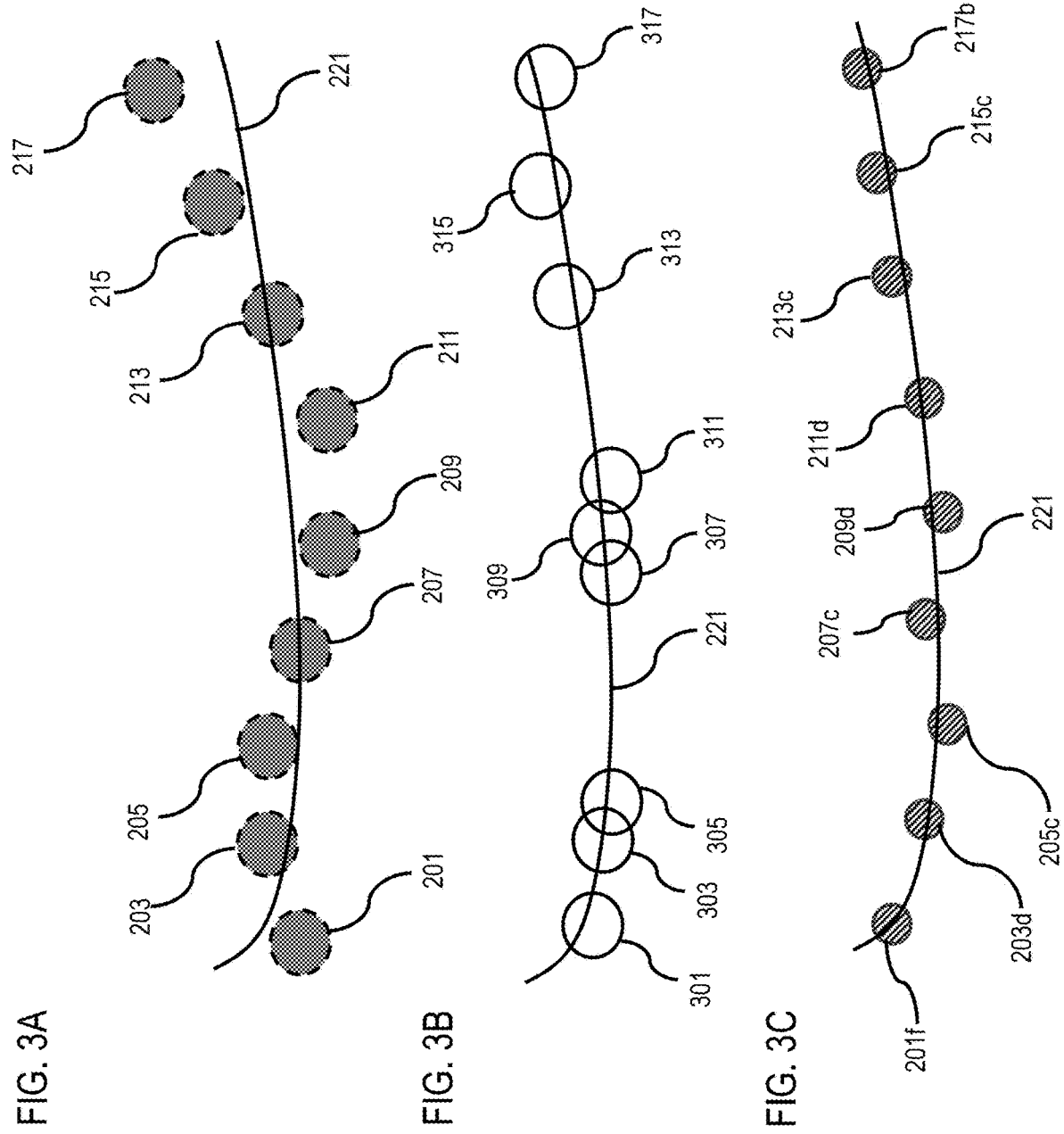

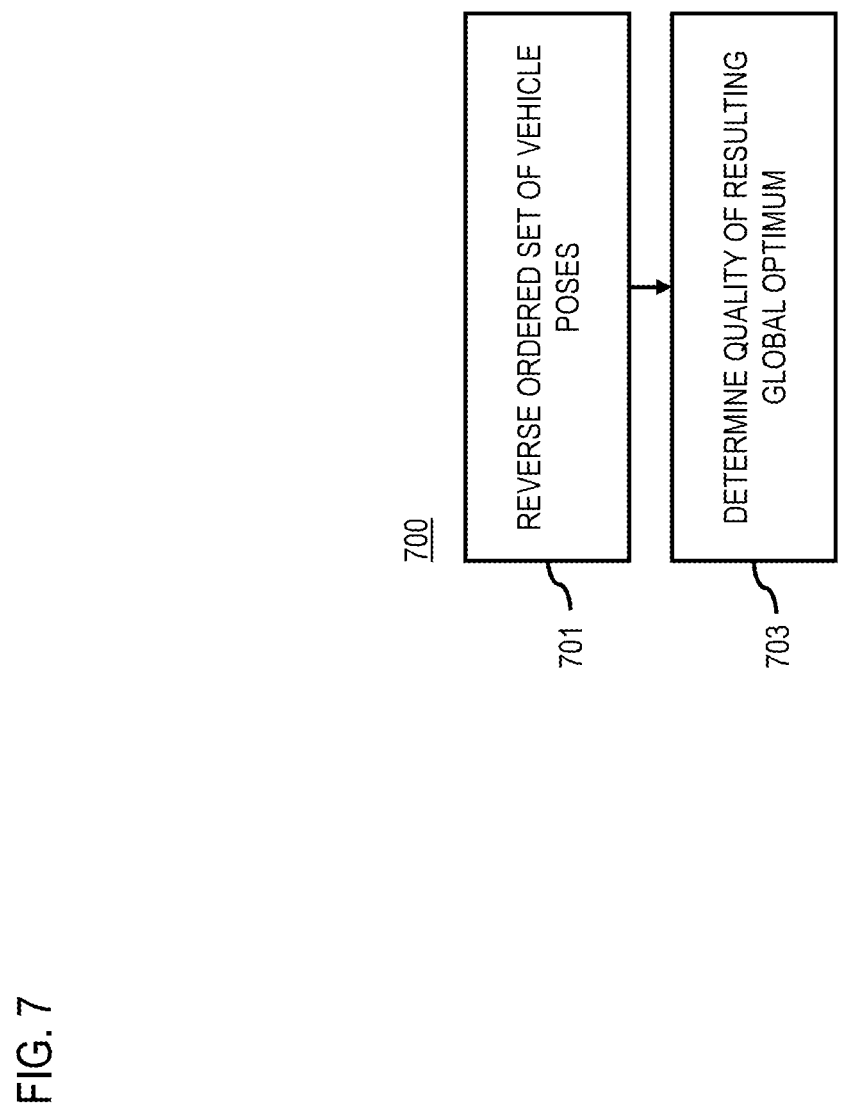

METHOD AND APPARATUS FOR ESTIMATING A LOCALIZED POSITION ON A MAP

BACKGROUND

Autonomous driving has quickly become an area of interest for vehicle manufactures and navigation/mapping service providers. One particular area of interest is the development of localization techniques to determine the position and/or direction of a vehicle (e.g., a vehicle pose) at an accuracy sufficient to support autonomous driving. For example, autonomous driving generally requires centimeter-level accuracy or better (i.e., lane-level) to ensure safe operation. Lane-level localization requires highly accurate maps and sophisticated location sensors (e.g., sensors using Global Positioning System (GPS), global navigation satellite system (GNSS), or equivalent) equipped on the vehicles or associated devices (e.g., portable or embedded navigation devices, smartphones, etc.). However, typical map accuracy is not sufficiently accurate at lane level (e.g., due to geometrical errors in map data) and GPS or similar sensors can be susceptible to errors (e.g., urban environment interference), which can have a significant impact on localization accuracy. Therefore, service providers and manufacturers face significant technical challenges to provide highly accurate positioning required for safe and stable autonomous driving.

Some Example Embodiments

Therefore, there is a need for an approach for localizing a vehicle pose (e.g., an autonomous vehicle) on a map (e.g., a digital map).

According to one embodiment, a method for localizing a vehicle pose on a map comprises receiving an input specifying the vehicle pose with respect to a road lane of the map, wherein the vehicle pose includes a vehicle position and a vehicle heading. The method also comprises searching over a set of candidate lateral offsets to select a lateral offset that minimizes a lateral error between the vehicle position with the lateral offset applied and a lateral location of the road lane, wherein the lateral offset and lateral error are lateral to a travel direction of the lane, and wherein the lateral location and the travel direction of the lane are determined from the map. The method further comprises searching over a set of candidate vehicle headings at the selected lateral offset to select a vehicle heading that minimizes a heading error between the vehicle heading and the travel direction of the lane. The method further comprises determining a local optimum of the vehicle pose based on the selected lateral offset and the selected vehicle heading, wherein the vehicle pose is localized to the map based on the local optimum.

According to another embodiment, an apparatus for localizing a vehicle pose on a map, comprises at least one processor, and at least one memory including computer program code for one or more computer programs, the at least one memory and the computer program code configured to, with the at least one processor, cause, at least in part, the apparatus to search over a set of candidate lateral offsets for the vehicle to select a lateral position that minimizes an error between a vehicle position with the lateral offset applied and a lateral location of the road lane, wherein the set of candidate lateral offsets is based on a vehicle pose with respect to a road lane of the map. The apparatus is also caused to search over a set of candidate vehicle headings at the selected lateral offset to select a vehicle heading that minimizes a heading error between the vehicle heading and the travel direction of the lane. The apparatus is further caused to iterate between the searching over the set of candidate lateral offsets and the searching over the set of candidate vehicle until a convergence criterion is met. The apparatus if further caused to determine a local optimum of the vehicle pose based on the meeting of the convergence criterion, wherein the vehicle pose is localized to the map based on the local optimum.

According to another embodiment, a non-transitory computer-readable storage medium for localizing a vehicle pose on a map carries one or more sequences of one or more instructions which, when executed by one or more processors, cause, at least in part, an apparatus to receive an input specifying the vehicle pose with respect to a road lane of the map, wherein the vehicle pose includes a vehicle position and a vehicle heading. The apparatus is also caused to search over a set of candidate lateral offsets to select a lateral offset that minimizes a lateral error between the vehicle position with the lateral offset applied and a lateral location of the road lane, wherein the lateral offset and lateral error are lateral to a travel direction of the lane, and wherein the lateral location and the travel direction of the lane are determined from the map. The apparatus is further caused to search over a set of candidate vehicle headings at the selected lateral offset to select a vehicle heading that minimizes a heading error between the vehicle heading and the travel direction of the lane. The apparatus is further caused to determine a local optimum of the vehicle pose based on the selected lateral offset and the selected vehicle heading, wherein the vehicle pose is localized to the map based on the local optimum.

According to another embodiment, an apparatus for localizing a vehicle pose on a map comprises means for receiving an input specifying the vehicle pose with respect to a road lane of the map, wherein the vehicle pose includes a vehicle position and a vehicle heading. The apparatus also comprises means for extracting a set of input features from the sensor data, map data representing the geographic location, or combination thereof. The apparatus further comprises means for searching over a set of candidate vehicle headings at the selected lateral offset to select a vehicle heading that minimizes a heading error between the vehicle heading and the travel direction of the lane. The apparatus further comprises means for determining a local optimum of the vehicle pose based on the selected lateral offset and the selected vehicle heading, wherein the vehicle pose is localized to the map based on the local optimum.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1 is a diagram of a system capable of localizing a vehicle pose (e.g., an autonomous vehicle) on a map (e.g., a digital map), according to one embodiment;

FIGS. 3A-3C are diagrams illustrating a comparison of results derived from raw vehicle sensor readings, a traditional localization method, and the process for localizing a vehicle pose on a map as described with respect to FIG. 1, according to one embodiment;

FIG. 7 is a flowchart of a process for determining the quality of the localization of the vehicle pose on the map, according to one embodiment;

DESCRIPTION OF SOME EMBODIMENTS

Figure 2A:
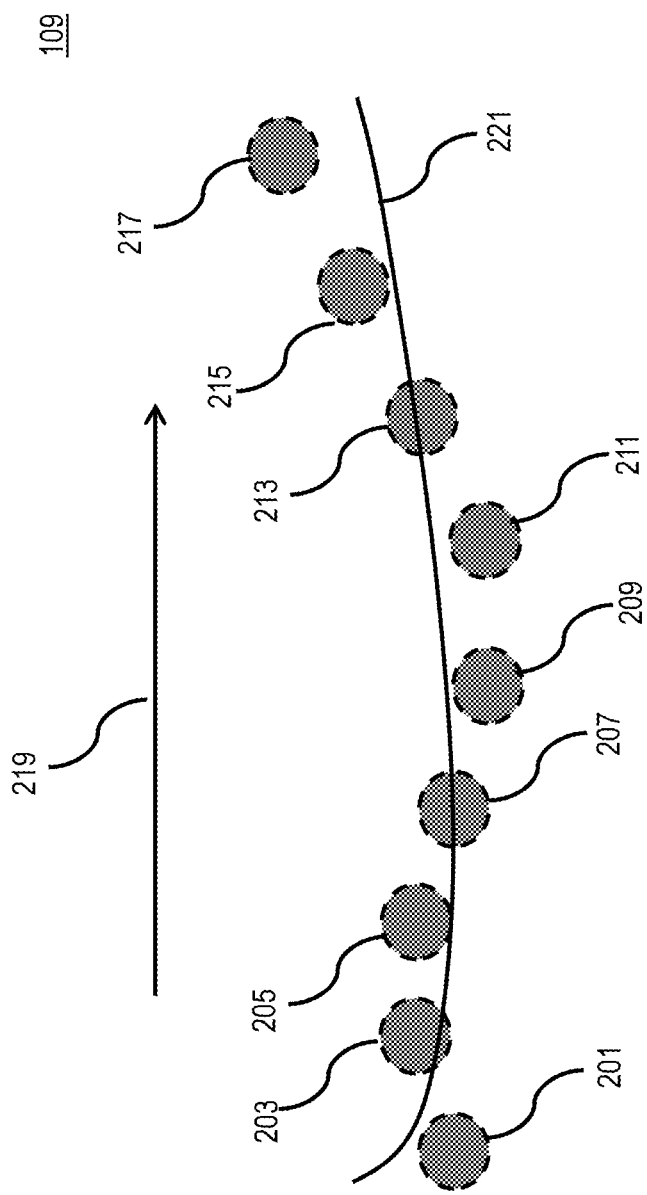
FIGS. 2A-2E are diagrams illustrating the process of FIG. 1 for localizing a vehicle pose on a map, according to one embodiment.

Examples of a method, apparatus, and computer program for localizing a vehicle pose on a map, are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1 is a diagram of a system capable of localizing a vehicle pose on a map, according to one embodiment. The various embodiments described herein relate broadly to optimal position-estimation using trajectory data (e.g., time-sequenced vehicle pose data indicating location and heading), and are described with respect to autonomous driving, and specifically to vehicle positioning on a map (e.g., a digital map). However, it is contemplated that the embodiments are also applicable to any other type of vehicles (e.g., including non-autonomous), devices (e.g., smartphones, personal navigation devices, etc.), and/or any other component capable of generating trajectory data indicating movement through a physical space. With respect to vehicle localization, in order to accurately position a vehicle 101 (e.g., an autonomous or highly-assisted vehicles (HAD) vehicle) a class of robotics or automated techniques called localizing can be adopted. For example, during localization, the vehicle position and/or heading direction (e.g., a vehicle pose) can be obtained from various sensors of the vehicle 101. As shown in FIG. 1, the vehicle 101 can be equipped with a variety of sensors including but not limited to location sensors 103 (e.g., configured to process signals from positioning satellites 105—e.g., a Global Positioning System (GPS) satellite), and other sensors 107 (e.g., camera sensor, LiDAR sensor, RADAR sensor, etc.) to assist in correctly localizing the vehicle 101 on a lane 109 of a digital map 111. In one instance, the vehicle position and/or heading direction may come from a user equipment (UE) 113 associated with a user or the vehicle 101 (e.g., a mobile device or in-vehicle navigation system) executing one or more applications 115 (e.g., a navigation or mapping application).

Accurately determining the vehicle 101's location on the map 111 enables planning of a route, both on fine and coarse scales. On a coarse scale, navigation maps (e.g., a digital map provided from a geographic database 117) allow a vehicle 101 to know what roads to use to reach a destination. However, on a finer scale, digital maps allow a vehicle 101 to know what lanes to be in (e.g., lane 109) and when to make lane changes (i.e., lane-level localization). Further, lane-level localization (i.e., highly accurate positioning) of an autonomous vehicle (e.g., vehicle 101) is required for safe-driving and map-update use-cases.

With respect to lane-level localization and also generally with respect to autonomous driving, high accuracy and real-time localization of vehicles 101 is needed. Traditionally, most vehicle navigation systems have accomplished this localization using GPS-based location sensors 103, which generally provide a real-time location with a 95% confidence interval of 7.8 meters. However, in complicated urban environments, reflection of GPS signals can further increase this error, such that a vehicle's location may be off by as much as 30 meters. In other words, the challenge with raw-sensor readings such as those from GPS or equivalent devices is that systematic errors, stemming from multipath reflection in areas such as urban canyons, often cause inaccurate readings from the location sensors 103. Given that the width of many lanes is 3-4 meters, this accuracy is not sufficient to properly localize the vehicle 101 (e.g., an autonomous vehicle) so that it can make safe route planning decisions. While sensor fusion using other sensors 107 (e.g., inertial sensors (INS) or inertial measurement units (IMUs)) can increase the accuracy of localization by taking into account vehicle movement, the systematic errors in urban canyons or other similar terrain features that result in sensor interference can result in incorrectly positioning the vehicle 101 by as much as several blocks away from its true location.

In general, a localization accuracy to specific lanes of road segment or better is needed for safe driving. Traditionally, lane-level localization techniques assume a gaussian error distribution for given sensor readings and correct for inaccurate positioning by comparing the data from the map to data observed from the vehicle's sensors—such localization techniques fall into, for instance, the category of Kalman filters. When the error distributions are non-gaussian or the position of the vehicle is completely unknown, particle filters, or parametric approaches have been adopted to correct for the vehicle position. However, in either case—online filtering causes the estimated vehicle pose to "jump-around" the true location of the vehicle (e.g., vehicle 101) due to the nature of the filtering-framework and such cases lead to the localized pose being worse than raw-sensor data. Further, the current state of technology to determine if the localizer is performing satisfactorily includes comparing overlays of the localized pose to the satellite imagery to provide context to a human user. The human user then needs to identify issues and manually flag regions where the localized pose is inaccurate, all of which can lead to slow and costly results that may be insufficient for autonomous driving purposes.

To address these technical challenges, the system 100 of FIG. 1 introduces a capability to leverage optimal trajectory estimation from the observed trajectory of the vehicle 101 to overcome the technical problems associated with the localized pose "jumping around". For example, optimal trajectory estimation advantageously provides implicit trajectory smoothing of the localized pose in the formulation of the localizer of the system 100 through trajectory constraints. Since the next possible pose to determine the search space is causal and depends the previous pose, the system 100 overcomes "jumps" in the pose that are typical in traditional localizers (e.g., by searching over possible lateral offsets, vehicle heading, and longitudinal offsets). In addition, optimal trajectory estimation further provides for automated quality assurance of localization results that is also implicit in the formulation of the localizer (e.g., by applying trajectory-based constraints to verify or determine the quality of localization results).

In one embodiment, the system 100 formulates the localization problem as a linear-search technique that uses the expectation-maximization (EM) framework to solve for the lateral offsets to the map, the heading of the vehicle, and the longitudinal position of the vehicle (i.e., the localization components). The linear search technique or algorithm involves sequentially searching through each element of a data set until a target value is found within the set. For example, the system 100 may search through all possible vehicle poses until the system 100 finds the vehicle pose that best matches the heading of the road or lane that the vehicle is traveling on. The EM framework or algorithm is an iterative method to find the (local) maximum likelihood parameters or maximum a posteriori (MAP) estimates of parameters in a statistical model where the equations cannot be solved directly. The EM framework is particularly useful with respect to latent variables and incomplete or missing data (e.g., a mix of unknown parameters and known data observations). Further, the EM framework is often used with respect to clustering and mixture models (e.g., soft clustering and probability distributions). Specifically, the EM algorithm is based on the premise that there is an approach to simultaneously solve the results of taking the derivatives of the likelihood function with respect to all unknown values, the parameters, and the latent variables. In this instance, the unknown values, parameters, and/or latent values are the localization components (e.g., lateral offsets, longitudinal offsets, and/or heading offsets from a true vehicle pose). Through the use of the EM framework, the system 100 can pick an arbitrary value for one set of unknowns (e.g., lateral offset or lateral position) and then use that value to estimate the second set of unknowns (e.g., vehicle heading, longitudinal offset or position). Thereafter, the system 100 uses the new value(s) to improve the estimate of the first set, and then keeps alternating between the two sets (i.e., iterating) until the respective values converge.

FIGS. 2A-2E are diagrams illustrating the process of FIG. 1 for localizing a vehicle pose on a map, according to one embodiment. In one embodiment, given an initial guess of a vehicle position (e.g., the vehicle 101)/raw sensor reading (e.g., location sensors 103), the system 100 can use the current map location of the vehicle 101 to identify the heading of a lane or road (e.g., lane 109) on the digital map 111. For example, the system 100 may start with the assumption that the raw sensor reading 201 is the initial guess of the position of vehicle 101 and the raw sensor reading 217 is the current map location (i.e., the location of the vehicle 101 on the lane 109). In one instance, the system 100 may base the initial guess on a plausible starting point (e.g., sensor reading 201 or sensor reading 217). In one embodiment, the system 100 can update its guess once it determines a first measurement (e.g., a time stamp associated with raw location sensor reading) of the vehicle 101's trajectory. In one embodiment, based on a vehicle heading readings, and/or time difference between two raw sensor readings, the system 100 can infer a direction and/or speed of travel of the vehicle 101. In one instance, the system 100 can infer that at least a portion of the lane 109 that the vehicle 101 is traveling has a heading consistent with the travel direction and/or speed of vehicle 101 (e.g., left to right represented by the arrow or heading 219). As described above, because highly accurate positioning is required for safe autonomous driving, the sensor readings 201-217 alone may not provide a safe-driving route on the lane 109 as shown by the lateral offset between respective sensor readings and the reference/ground truth data (best possible) line 221.

Figure 2B:
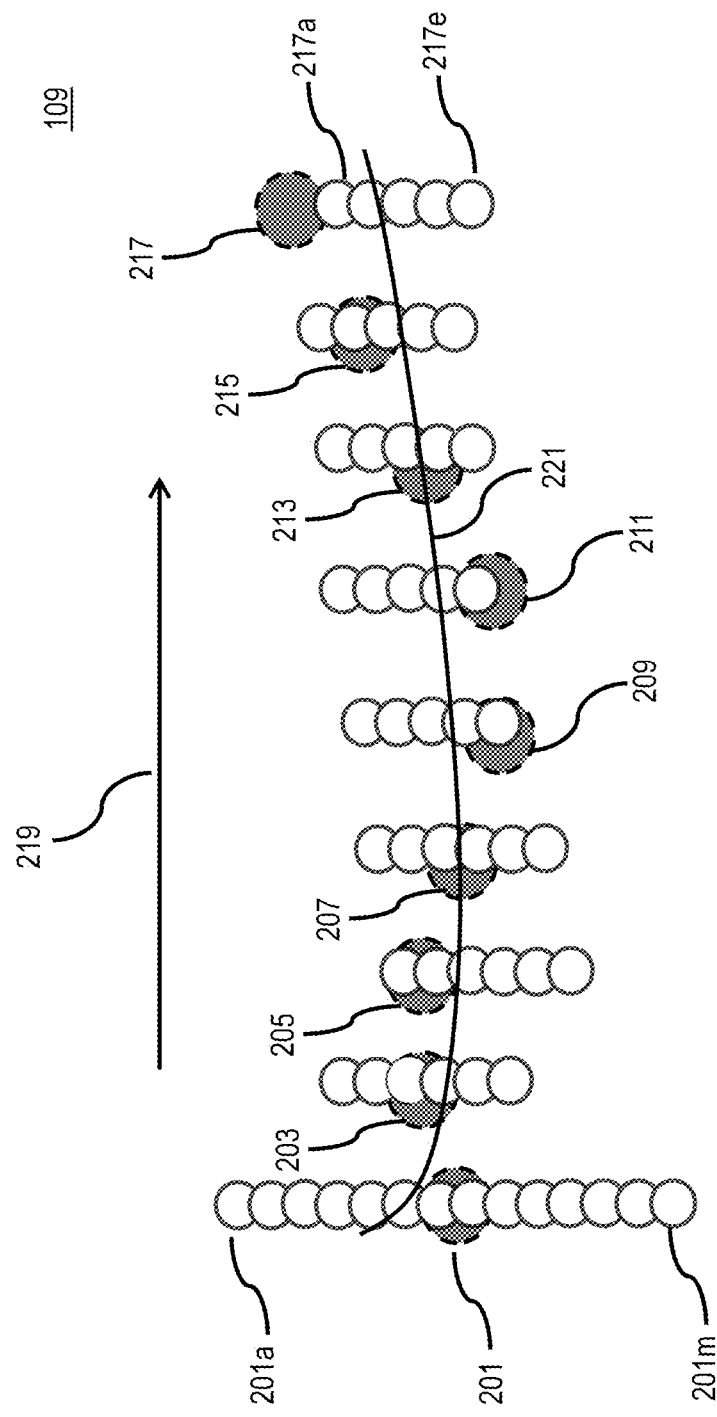
Figure 2C:
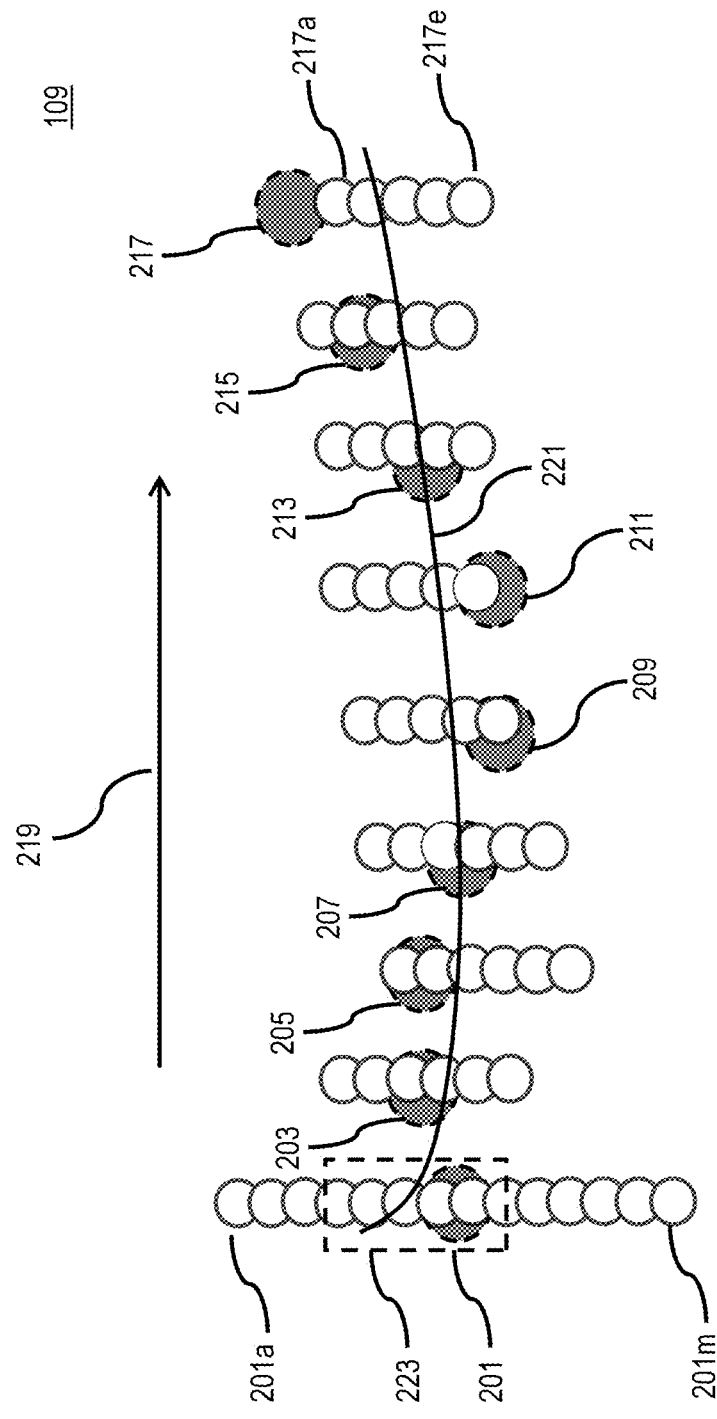
Figure 2D:
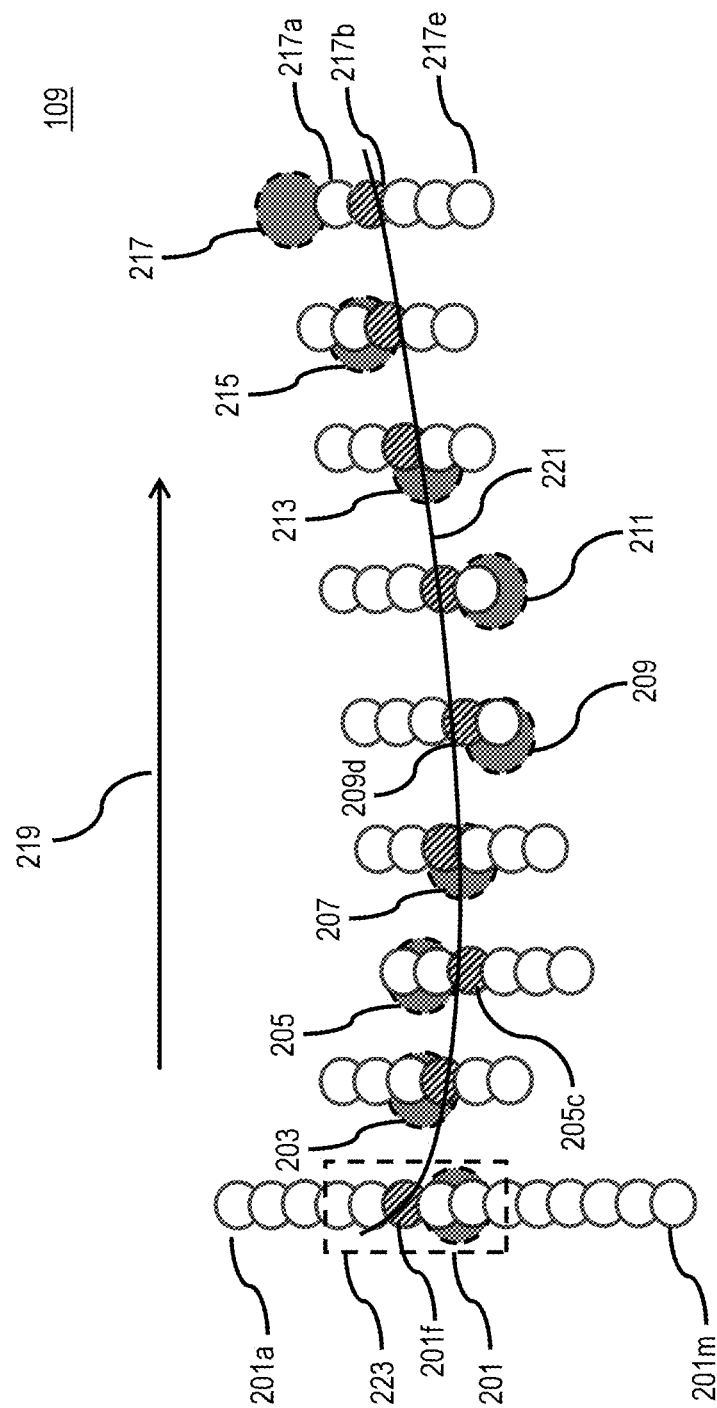

In one embodiment, knowing the heading of a lane or road that the vehicle is traveling on (e.g., lane 109) can enable the system 100 to infer all possible vehicle poses (e.g., of vehicle 101) that are consistent with the heading of the lane or road (e.g., lane 109). In this instance, the vehicle pose and the vehicle lateral position relative to the lane 109, the map 111, or a combination thereof are the same. For example, the system 100 can infer it is unlikely that a vehicle 101 would have a pose perpendicular to the heading of lane 109 (e.g., heading 219) and, therefore, the system 100 can limit the possible poses or position to those poses or positions that match and/or are at least partially consistent with the heading 219, as depicted in FIG. 2B. By way of example, lateral positions 201a-201m may represent all possible poses of the vehicle 101 relative to the lane 109, the heading 219, and the sensor readings 201-217.

In one embodiment, the system 100 can identify all possible vehicle poses or positions based on the width of the lane 109, a width of a road, a width of the vehicle 101 or an average vehicle, or a combination thereof. In one instance, the possible vehicle poses may be based on a predicted or known lateral offset relative to a raw sensor reading (e.g., a GPS sensor 103). By way of example, a sensor reading (e.g., sensor readings 201-217) may typically be ±x distance from the actual location sensors 103 (e.g., GPS). In one instance, a portion of the lateral offset may result from the delay between the transmission of sensor data and its receipt relative to the speed of the vehicle 101. In other words, by the time the system 100 receives a sensor reading, the vehicle 101 is no longer in that position and, therefore, the system 100 must accommodate for such offset. In this example, it may be the case that the width of the lane 109, or the width of a road, or a combination thereof at or about the sensor reading 201 is twice the width of the lane 109, a road, or a combination thereof at or about the sensor readings 203-217.

In one embodiment, once all possible vehicle poses are known to the system 100 (e.g., lateral positions 201a-201m), the system 100 searches laterally over the poses to minimize an error between the map 111 and the current set of sensor observations (e.g., sensor readings 201-217) and to obtain a best (and/or initial) lateral position of the vehicle 101. In one embodiment, the system 100 searches the poses by employing a linear-search technique as described above that uses the EM framework to pick a lateral position that may or may not ultimately be the localized position of the vehicle 101 on the lane 109, the map 111, or a combination thereof (i.e., the local optimum). For example, the system 100 may start with the lateral position 201m and search towards the position 201a (or vice-versa) until a lateral position of the vehicle 101 is found that satisfies or fits within a threshold criterion (e.g., a threshold of safety, a threshold of acceptable deviation, etc.). In one instance, the system 100 can use the value of the lateral position 201m to then estimate all possible vehicle headings relative to the lateral position, the lane 109, the heading 219, or a combination thereof. In one embodiment, the system 100 can narrow the best lateral position to one or more lateral positions among all possible vehicle poses that minimize the distance between the vehicle 101 and a centerline of the lane 109, a centerline of a road, or a combination thereof. In one embodiment, the system 100 can narrow the best lateral position to one or more lateral positions among all possible vehicle poses that would enable the vehicle 101 to travel from a lateral position associated with the sensor reading 201 (e.g., lateral positions 201a-201m) to a lateral position associated with the sensor reading 217 (e.g., lateral positions 217a-217e) in a manner consistent with the heading 219, safe driving, etc. In one embodiment, the system 100 may start lateral searching the lateral positions of the vehicle 101 that are near or proximate to the middle or the mean of the possible poses (e.g., within the area 223 of FIG. 2C) before proceeding to solve for the vehicle heading.

In one embodiment, the system 100 can use a best lateral position to identify all possible vehicle headings in the same or similar way that the system 100 used the road heading to identify a best lateral position. In this instance, the vehicle heading may be understood to mean the yaw or rotation of the vehicle 100 around the z-axis of a Cartesian coordinate system (the x-axis being parallel to the vehicle 101 and the y-axis being perpendicular). In one embodiment, the system 100 searches all possible vehicle headings by again employing a linear-search technique that uses the EM framework to pick a vehicle heading that matches and/or is at least consistent with the heading of the lane 109 (e.g., heading 219), a subsequent sensor reading, one or more possible lateral positions associated with the subsequent sensor reading, a threshold criteria (e.g., a heading that matches a safety criteria for driving on the road given the heading), or a combination thereof. In one instance, all possible vehicle headings could range from any heading rather than 0° to any heading less than 90° (i.e., not perpendicular to the lane 109/heading 219 and/or opposite to the heading 219).

In one embodiment, once a vehicle heading is selected by the system 100, the system 100 iteratively optimizes between the lateral search and the heading search. In one instance, the system 100 uses the determined vehicle heading to solve for a better estimate of the best lateral position, which may or may not be the lateral position previously estimated by the system 100 as the best lateral position before identifying a vehicle heading. In the example where the system 100 determines a new or better estimate of the lateral position of the vehicle 101, the system 100 then uses that position to determine all of the possible vehicle headings based on that position and then searches over them for a new best vehicle heading. In one embodiment, the system 100 iteratively optimizes between the lateral search and the heading search until the system 100 determines that the results have reached a convergence criterion (e.g., a maximum number of iterations).

In one embodiment, given the convergence criteria, the system 100 searches longitudinally along the road to correct for the vehicle location. In one embodiment, the system 100 searches all possible or estimated longitudinal positions by again employing a linear-search technique that uses the EM framework to solve for the longitudinal position. In one instance, the system 100 can solve for the correct vehicle location based on the identified best lateral position, vehicle heading, or a combination thereof. In one embodiment, the corrected or resultant vehicle position comprises a local optimum or a localized position on the map 111. By way of example, the lateral position 201f may be deemed a local optimum or the localized position of the vehicle 101 on the lane 109, the map 111, or a combination thereof relative to the sensor reading 201. In one embodiment, the system 100 then initializes the next set of lateral searches using that local optima. For example, the system 100 can repeat the process described above with respect to the sensor readings 203, 205, and so forth. This approach ensures that trajectory constraints are implicitly generated by the system 100. Moreover, as noted above, since the next possible pose to determine the search space is casual and depends on the previous pose, the filtering framework overcomes jumps in the pose (typically found in traditional filters). In one embodiment, the system 100 searches for several local optima along a given sequence (e.g., local optima 201*f*, 209*d*, and 217*b*) to approximate the global optimate for the localized vehicle pose (e.g., vehicle 101) on the map 111.

Figure 2E:
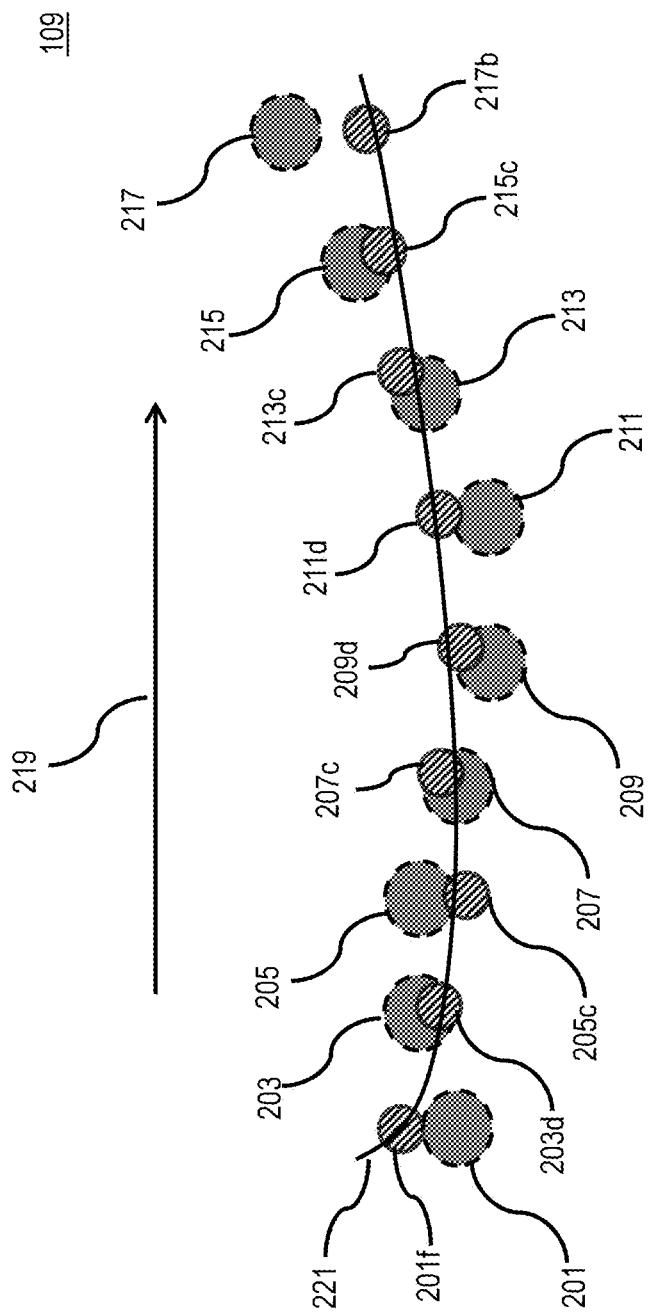

In one embodiment, the system 100 also includes a fully-automated quality analysis (QA) for the localization of the vehicle pose on the map. In one instance, the ordered inputs are reversed and fed back into the localizer (i.e., the system 100). Consequently, the system 100 requires two poses for automated QA. For example, in the instance where the system 100 starts with the sensor reading 201 and works towards the sensor reading 217, the system 100 can reverse the order and start with the sensor reading 217 and work towards to the sensor 201 to see whether the forward solution (e.g., 201 to 217) and the backward solution (e.g., 217 to 201) are identical. If so, the system 100 can determine that the best possible localization has been achieved, as depicted in FIG. 2E. In one embodiment, the system 100 is fully parallelizable and can run in real time or substantially real time.

FIGS. 3A-3C are diagrams illustrating a comparison of results derived from raw vehicle sensor readings, a traditional localization method, and a process for localizing a vehicle pose on a map as described with respect to FIG. 1, according to one embodiment. In this instance, FIGS. 3A and 3C follow the examples described with respect to FIGS. 2A and 2E, respectively. Referring to FIG. 3A (FIG. 2A), the system 100 collects sensor readings 201-217 (e.g., from location sensors 103) of a vehicle 101 traveling on a lane or a road (e.g., lane 109). As described above, the sensor readings 201-217 exhibit various degrees of deviation from the reference/ground truth data (e.g., reference line 221) and such deviation is typically outside of a safety or accuracy criteria required for lane-level localization. Traditional on-line filtering of the sensor readings 201-217 (i.e., off-the-shelf localization techniques) is also problematic. As shown in FIG. 3B, such filtering causes the estimated vehicle pose (e.g., positions 301-317) to "jump around" the true location of the vehicle 101 (e.g., reference line 221) due to the nature of the filtering-framework and such cases can lead to the localized pose (e.g., positions 301-317) being worse than the sensor readings 201-217. In contrast, FIG. 3C (FIG. 2E) depicts an optimal trajectory estimation based on the process of FIG. 1 that overcomes the issue of localized pose "jumping around."

Figure 4:
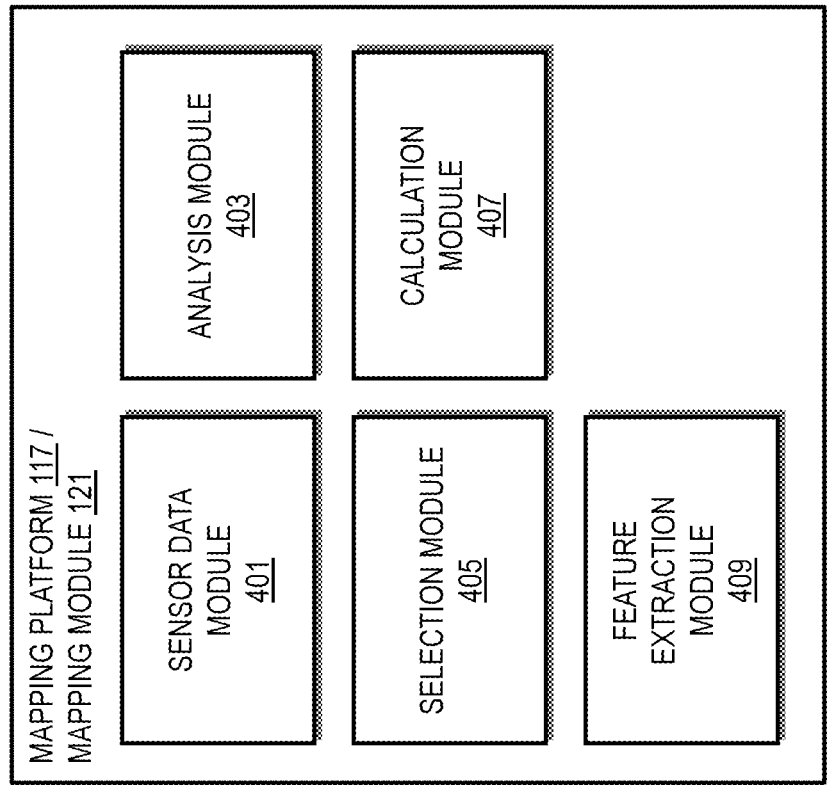
FIG. 4 is a diagram of the components of the mapping platform/mapping module of FIG. 1, according to one embodiment.

FIG. 4 is a diagram of the components of the mapping platform/mapping module of FIG. 1, according to one embodiment. In one embodiment, the mapping module 121 of the vehicle 101 can perform all or a portion of the functions of the mapping platform 119 alone or in combination with the mapping platform 119. By way of example, the mapping platform 119 and/or mapping module 121 include one or more components for localizing a vehicle pose (e.g., an autonomous vehicle) on a digital map. It is contemplated that the functions of these components may be combined or performed by other components of equivalent functionality. In this embodiment, the mapping platform 119 and/or mapping module 121 include a sensor data module 401, an analysis module 403, a selection module 405, a calculation module 407, and a feature extraction module 409. The above presented modules and components of the mapping platform 119 and/or mapping module 121 can be implemented in hardware, firmware, software, or a combination thereof. Though depicted as separate entities in FIG. 1, it is contemplated that the mapping platform 119 and/or mapping module 121 may be implemented as a module of any of the components of the system 100 (e.g., a component of the vehicle 101, services platform 127, services 129, etc.). In another embodiment, one or more of the modules 401-409 may be implemented as a cloud-based service, local service, native application, or combination thereof. The functions of the mapping platform 119, the mapping module 121, and the modules 401-409 are discussed with respect to FIGS. 5-7, 9, and 10 below.

Figure 5:
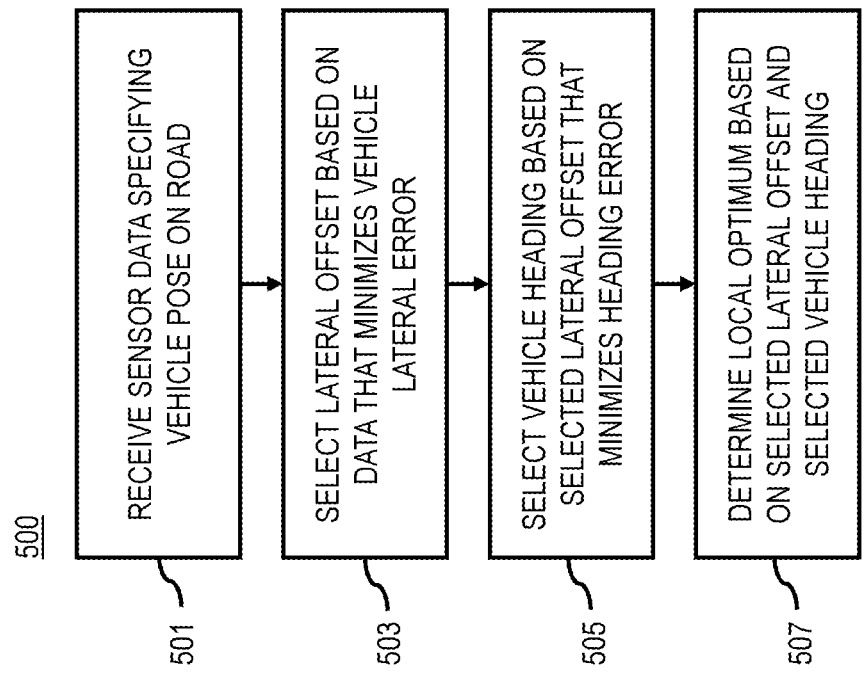
FIG. 5 is a flowchart of a process for localizing a vehicle pose on a map, according to one embodiment.
Figure 12:
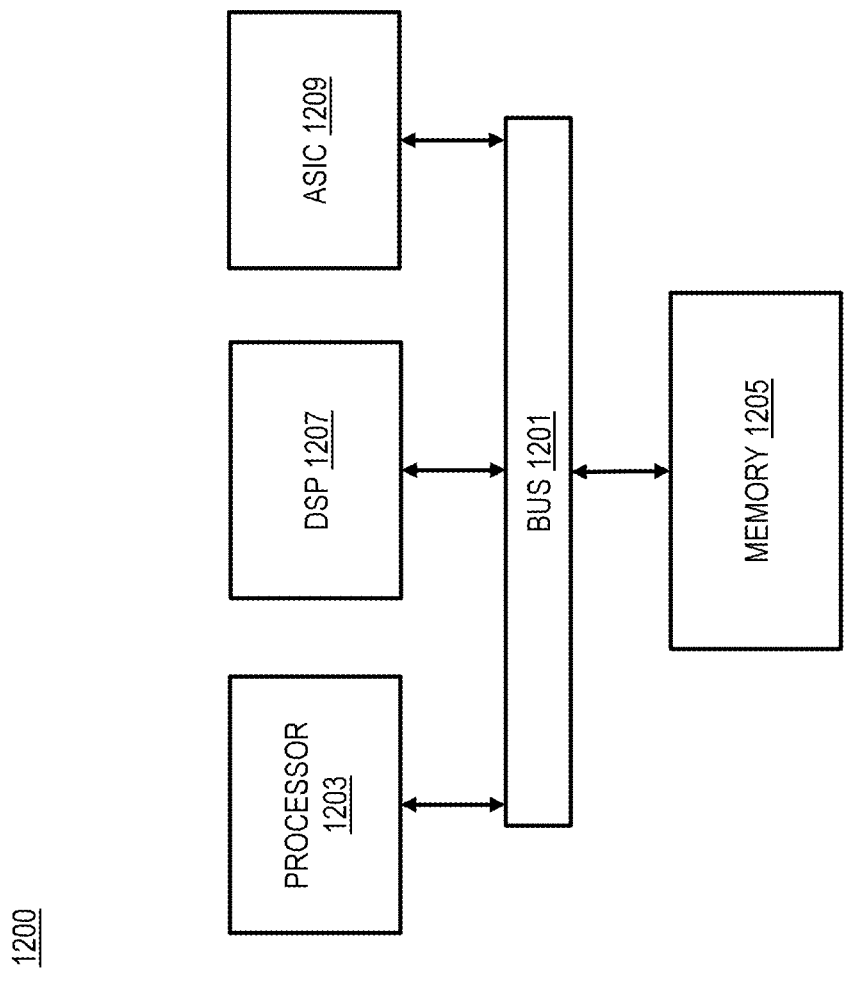
FIG. 12 is a diagram of a chip set that can be used to implement an embodiment of the invention.

FIG. 5 is a flowchart of a process for localizing a vehicle pose on a map, according to one embodiment. In various embodiments, the mapping platform 119, the mapping module 121, and/or the modules 401-409 as shown in FIG. 4 may perform one or more portions of the process 500 and may be implemented in, for instance, a chip set including a processor and a memory as shown in FIG. 12. As such, the mapping platform 119, mapping module 121, and/or the modules 401-409 can provide means for accomplishing various parts of the process 500, as well as means for accomplishing embodiments of other processes described herein in conjunction with other components of the system 100. Although the process 500 is illustrated and described as a sequence of steps, it is contemplated that various embodiments of the process 500 may be performed in any order or combination and need not include all of the illustrated steps.

In step 501, the sensor data module 401 receives an input specifying the vehicle pose (e.g., vehicle 101) with respect to a road lane (e.g., lane 109) of a map (e.g., a digital map 111). In one embodiment, the input includes an ordered set of vehicle poses (e.g., vehicle pose n, vehicle pose n+1, etc.). In one instance, the input is based on an estimate of the vehicle pose, sensor data indicating the vehicle pose, or a combination thereof. By way of example, a vehicle pose may include a vehicle position and a vehicle heading relative to a lane or road (e.g., lane 109). In one instance, a vehicle pose may simply mean a lateral position of the vehicle 101 relative to one or more boundaries of a lane or road (e.g., a curb, lane lines, etc.), a digital map, or a combination thereof. In one embodiment, the sensor data module 401 may receive an input (e.g., a sensor reading) from one or more location sensors 103 (e.g., GPS sensors) associated with the vehicle 101. In certain circumstances, GPS sensors can provide a rough estimation of a vehicle pose relative to a digital map. Specifically, the estimation is generally rough because of one or more positioning system errors (e.g., signal outage, urban environment interference, etc.) and, therefore, this estimation alone may be unsuitable for lane-level localization where a high degree of precision is often required. In one embodiment, the sensor data module 401 may also receive an input (e.g., imagery data) from one or more other sensors 107 (e.g., a camera sensor, a LiDAR sensor, a RADAR sensor, etc.) associated with the vehicle 101. In one instance, the input or data received from the one or more location sensors 103, the one or more other sensors 107, or a combination thereof can enable the sensor data module 401 to make an initial estimate of the vehicle pose on the lane 109, the digital map 111, or a combination thereof. In one embodiment, the mapping platform 119 may start with a uniform distribution of all possible vehicle poses across the lane 109 or across an entire road. Thereafter, the mapping platform 119 can use any inputs received by the sensor data module 401 (e.g., GPS data) with respect to the movement of the vehicle 101 to update its lane/road belief distribution. As described above, lane-level localization as opposed to a coarser road localization is required for safe and stable autonomous driving. Therefore, the vehicle 101 pose based on the received inputs requires further refinement as described below.

In step 503, the analysis module 403 searches over a set of candidate lateral offsets to select a lateral offset that minimizes a lateral error between the vehicle position (e.g., vehicle 101) with the lateral offset applied and a lateral location of the road lane (e.g., lane 109). In one embodiment, the lateral offset and the lateral error are lateral to a travel direction of the lane 109 and the lateral location and the travel direction of the lane 109 are determined from the map 111. In one instance, the lateral offset or position enables the mapping platform 119 to keep the vehicle 101 in the center of the lane or road (e.g., lane 109). By way of example, the lateral offset may be a result of an imprecision with respect to location sensor 103 data (e.g., GPS sensor data). For example, the raw sensor data associated with a vehicle 101 may deviate or be laterally offset from the reference/ground truth data (best possible), as depicted in FIG. 2A. In one instance, the set of candidate lateral offsets comprises all possible lateral vehicle poses on the lane or road (e.g., lane 109), the map, or a combination thereof, as depicted and described with respect to FIG. 2B. In this instance, all possible lateral vehicle poses are constrained by the fact that the lateral offsets are lateral (as opposed to perpendicular) to the travel direction or heading of the lane 109 (e.g., heading 219). By way of example, the possible lateral vehicle poses or positions may be based on a width of the land 109, a width of the vehicle 101, or a combination thereof. The same can be said for the lateral locations on the road lane. In one instance, while there may be an infinite number of lateral positions with respect to a single lane (e.g., a millimeter or smaller one way or another), a vehicle 101 may generally be considered centered within the boundaries of the lane (e.g., within lane lines or markings), adjacent or proximate to a left lane line or marking, or adjacent or proximate to a right lane line or marking in terms of a lateral location of the road lane (i.e., centered or lateral offset in one direction or another). Because autonomous driving as described above requires precise localization (e.g., within 10 cm), any lateral offset or divergent lateral location between the vehicle 101 on the lane 109 and the vehicle 101 on the map 111 may be considered a lateral error, at least for the purposes of safe and stable driving. In one embodiment, the analysis module 403 then searches over the set of candidate lateral offsets based on a linear-search technique that uses the EM framework as described above with respect to FIGS. 2C and 2D to solve for the best lateral position (e.g., lateral position 201f). In one instance, the best lateral position comprises the lateral offset that minimizes the lateral error between the vehicle position (e.g., vehicle 101) with the lateral offset applied and a lateral location of the road lane (e.g., lane 109).

Figure 6:
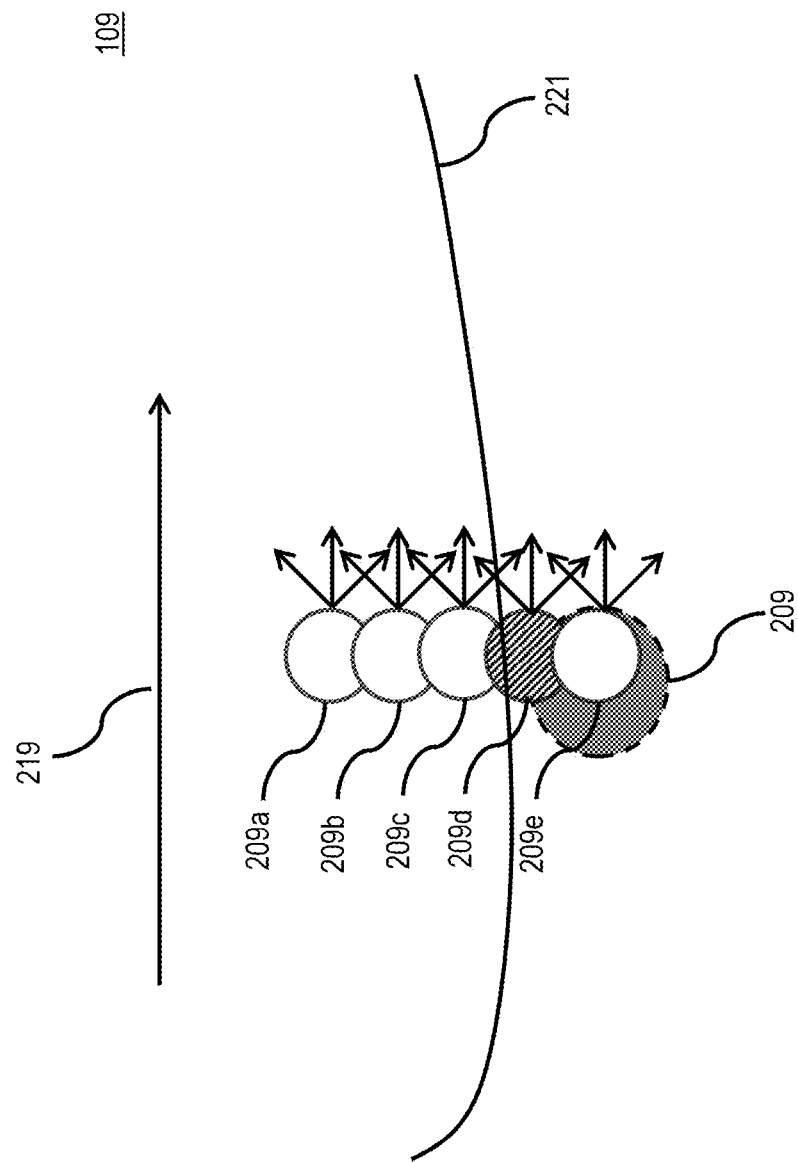
FIG. 6 is a diagram illustrating a process of searching over all possible vehicle headings given the best lateral position as described with respect to FIG. 5, according to one embodiment.

In step 505, the analysis module 403 searches over a set of candidate vehicle headings at the selected lateral offset to select a vehicle heading that minimizes a heading error between the vehicle heading and the travel direction of the lane (e.g., land 109/heading 219). By way of example, the vehicle heading is the direction of travel and/or the yaw position around the z-axis on a Cartesian coordinate grid. In one embodiment, the set of candidate vehicle headings are all possible vehicle headings. In one instance, assuming that a vehicle (e.g., the vehicle 101) is not traveling perpendicular to the lane or road (e.g., lane 109), the analysis module 403 can limit the possibility of vehicle headings to a heading of between >0° and <180°. FIG. 6 is a diagram illustrating a process of searching over all possible vehicle headings given the best lateral position as described with respect to FIG. 5, according to one embodiment. Specifically, FIG. 6 is a snapshot of FIG. 2D and generally follows the examples of FIGS. 2A-2E. In this example, the analysis module 403 may initially select a candidate lateral position (e.g., 209e) as the lateral position that minimizes a lateral error between the vehicle position (e.g., vehicle 101) with the lateral offset applied and a lateral location of the road lane (e.g., lane 109). Thereafter, in one embodiment, the analysis module 403 searches over a set of candidate vehicle headings. In this example, only the headings −45°, 90°, and 45° are represented; however, it is contemplated that the set of candidate vehicle headings could include all headings, a limited set of headings, or a combination thereof. In this example, the analysis module 403 could select a heading between −45° and 90° since that may minimize a heading error between the vehicle heading and the travel direction of the lane (e.g., lane 109). In particular, while the general heading of the lane 109 may be represented as 90° by the arrow 219, the reference/ground truth data (e.g., reference line 221) the heading of lane 109 increases slightly from 90° at the lateral position 209e.

In step 507, the calculation module 407 determines a local optimum of the vehicle pose based on the selected lateral offset and the selected vehicle heading, wherein the vehicle pose is localized to the map based on the local optimum. The position and heading of the vehicle 101 are important because these localization components are required by the mapping platform 119 to provide the vehicle 101 with a proper steering angle and speed to ensure safe and stable travel on the lane 109 (i.e., centered within the lane).

In one embodiment, the calculation module 407 determine the local optimum by iterating between the result of the analysis module 403 searching over the set of candidate lateral offsets and the result of the analysis module 403 searching over the set of candidate vehicle headings. By way of example, the analysis module 403 may first select the lateral offset (e.g., lateral position 209e of FIG. 6) based on the lateral offset criteria described above with respect to step 503. Then, the analysis module 403 may select a vehicle heading (e.g., between −45° and 90°) based on the vehicle heading criterial described above with respect to step 505. In one embodiment, based on the new vehicle heading (e.g., between −45° and 90°), the calculation module 407 can cause the analysis module 403 to repeat or iterate the selection of the lateral offset and the vehicle heading to determine another lateral position (e.g., lateral position 209d), another vehicle heading, or a combination thereof. In this instance, the calculation module 407 can determine that lateral position 209d of the vehicle 101 is the local optimum. In one embodiment, the calculation module 407 and the analysis 403 can continue performing the iteration until a convergence criteria is met. In one instance, the convergence criteria comprises a maximum number of iterations, a target error level, or a combination thereof.

In one embodiment, once the convergence criteria is met in step 507, the analysis module 403 searches over a set of candidate longitudinal offsets, wherein a respective set of candidate lateral offsets and a respective set of candidate vehicle headings are searched over at each candidate longitudinal offset to determine a respective set of local optima of the vehicle pose (e.g., vehicle 101). By way of example, the longitudinal offset is in the y-direction on a Cartesian coordinate system and it typically represents the speed or velocity of the vehicle 101. In one instance, the longitudinal position may be used by the mapping platform 119 to enable the vehicle 101 to safely change direction at an intersection, to maintain a safe distance in front or behind other vehicles, etc. In one embodiment, the set of candidate longitudinal offsets may be based on a speed or velocity of the vehicle 101, an elapse of time, a heading of the lane 109 (e.g., heading 219), or a combination thereof. In one instance, the analysis module 403 searches over the set of candidate longitudinal offsets based on a linear-search technique that uses the EM framework to solve for the longitudinal position in the same way that the analysis module 403 searches over the set of candidate lateral offsets and vehicle headings (i.e., the localizations components). In one embodiment, the analysis module 403 searches longitudinally along the lane or road (e.g., lane 109) to correct for the vehicle longitudinal position.

In one embodiment, the selection module 405 selects a longitudinal offset from the set of candidate longitudinal offsets that corresponds to a global optimum from among the respective set of local optima that minimizes the lateral errors, the vehicle heading error, a longitudinal error, or a combination thereof, wherein the vehicle pose is localized based on the global optima. In one instance, the analysis module 403 determines the global optimum with respect to the ordered set of vehicle poses (e.g., lateral poses 201a-201m). In one embodiment, the analysis module 403 searches for several local optima along a given sequence (e.g., local optima 201f, 209d, and 217b) to approximate the global optima for the vehicle pose (e.g., the vehicle 101). The global optima determined and/or approximated by the analysis module 403 may also be considered the trajectory. In one embodiment, the analysis module 403 determines the trajectory of the vehicle 101 based on the respective set of local optima. Further, in one instance, the analysis module 403 constrains the localization of the vehicle pose (e.g., the vehicle 101) based on the trajectory. Consequently, in one embodiment, the analysis module 403 implicitly generates trajectory constraints that smooth the localized pose of the vehicle 101, as depicted in FIGS. 2E and 3C.

FIG. 7 is a flowchart of a process for determining a quality of the localization of the vehicle pose on the map, according to one embodiment. In various embodiments, the mapping platform 119, the mapping module 121, and/or the modules 401-409 as shown in FIG. 4 may perform one or more portions of the process 700 and may be implemented in, for instance, a chip set including a processor and a memory as shown in FIG. 12. As such, the mapping platform 119, mapping module 121, and/or the modules 401-409 can provide means for accomplishing various parts of the process 700, as well as means for accomplishing embodiments of other processes described herein in conjunction with other components of the system 100. Although the process 700 is illustrated and described as a sequence of steps, it is contemplated that various embodiments of the process 700 may be performed in connection with the process 500 in any order or combination and need not include all of the illustrated steps. That is, in one embodiment, the process 700 can be used to determine whether a best possible localization of the vehicle pose (e.g., vehicle 101) on the map 111 has been achieved through the process 500.

In step 701, the selection module 405 reverses the ordered set of the vehicle poses (e.g., vehicle 101). By way of example, if the analysis module 403 started the localization process as described above with the sensor reading 201 and initiated the next set of lateral searches towards the sensor reading 217, then for the purposes of the quality analysis (QA), the analysis module 403 would reverse the order by starting the localization process with the sensor reading 217 and initiate the next set of lateral searches towards the sensor reading 201. In one embodiment, the QA process is fully-automated.

In step 703, the analysis module 403 determines a quality of the global optimum based on an ambiguity of the global optimum as a solution to the ordered set and the reversed ordered set. In one instance, if the analysis module 403 determines that the global solution is unambiguous, then the solutions to the ordered set and the reversed ordered set (i.e., the forward solution and the backward solution) are identical indicating that the mapping platform 119 has achieved the best localization (e.g., a localization sufficiently safe and stable for autonomous driving).

Figure 8A:
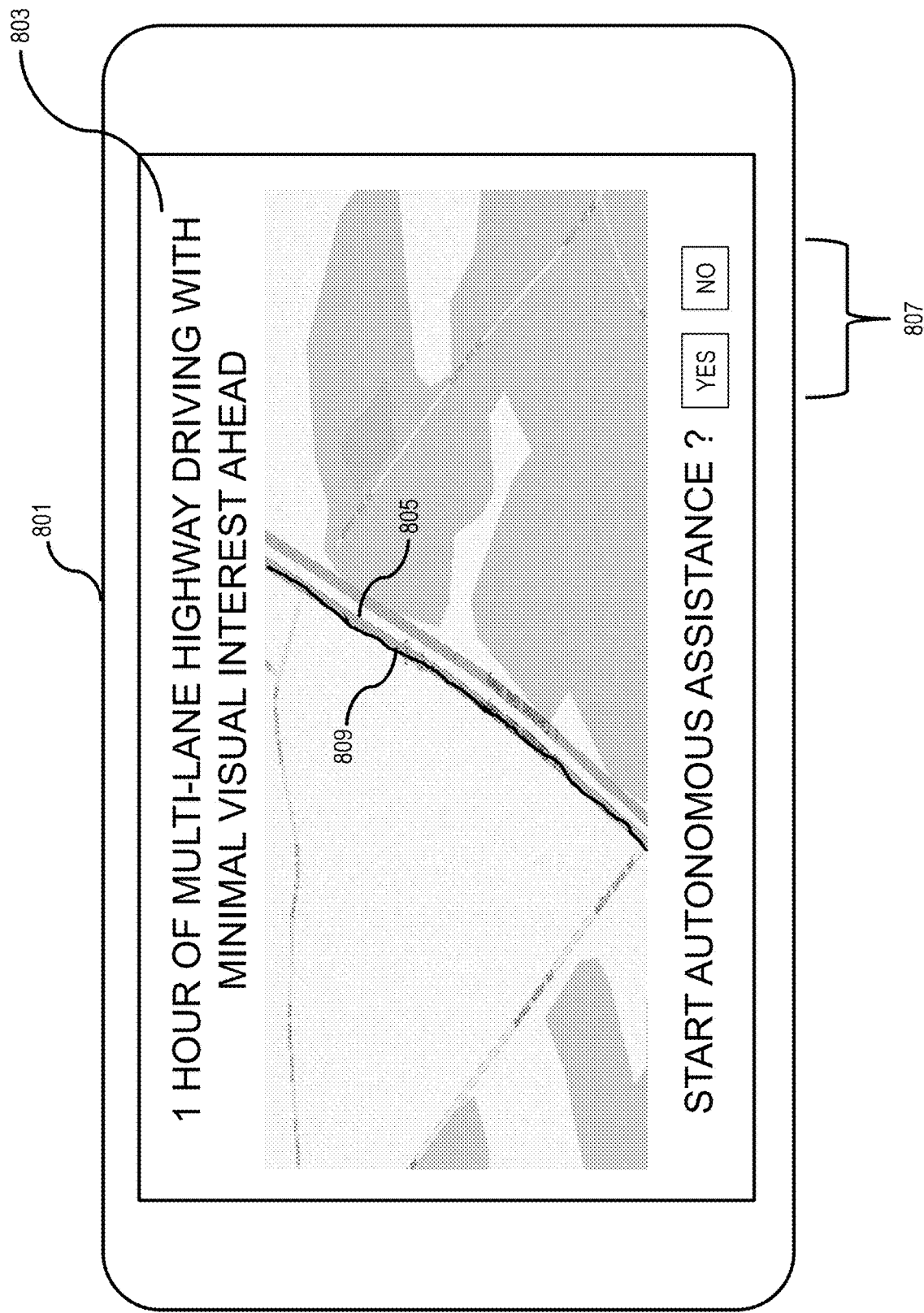
FIGS. 8A and 8B are diagrams of example user interfaces for localizing a vehicle pose on a map, according to one embodiment.
Figure 8B:
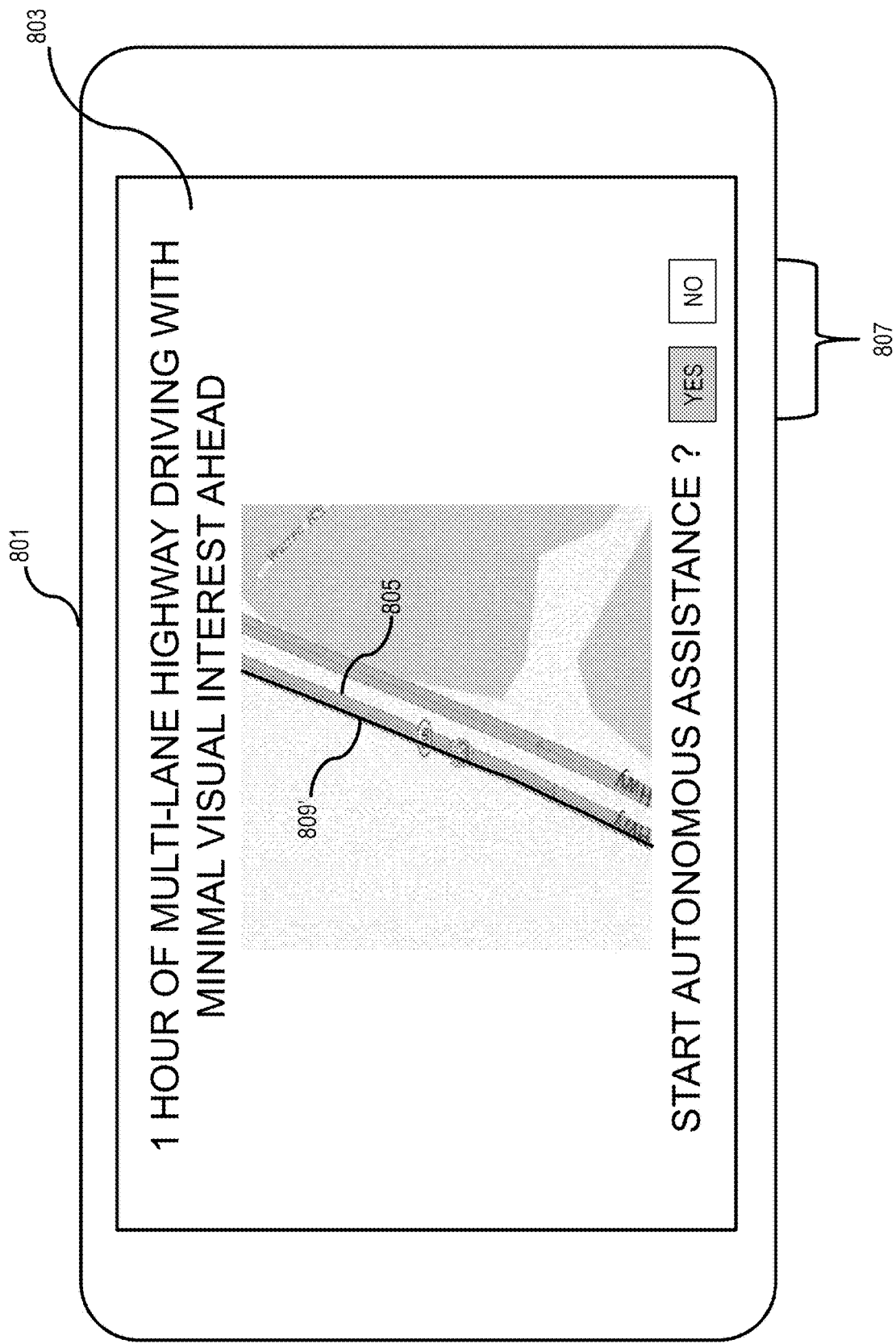

FIGS. 8A and 8B are diagrams of example user interfaces for localizing a vehicle pose (e.g., vehicle 101) on a digital map (e.g., map 111), according to one embodiment. In this example, a UI 801 is generated for a UE 113 (e.g., a vehicle navigation device, a mobile device, or a combination thereof) that includes a display 803 that enables a user to access a navigation application 115 to initiate the localization process of the system 100, as described above. In this example, the user is driving by herself or himself straight from New York to Miami and has activated the navigation application 131 to visualize her or his trip. By way of example, the user may want to visualize turns, exits, points of interest (POI) (e.g., a gas station or a rest stop), etc., along the route.

In this example, the system 100 can determine that the user is currently traveling on a large multi-lane highway 805 (e.g., Interstate 95) and will be doing so for a lengthy portion of time with little or no visual sights or POIs (e.g., 1 hour). In one embodiment, the system 100 can inquire whether the user wants to take advantage of the autonomous assistance mode of the vehicle 101. By way of example, it is contemplated that a user may lose concentration or focus when their surroundings are monotonous and repetitive. In this instance, the user presses or taps the "yes" input 807, as depicted in FIG. 8B. However, upon activation of the autonomous assistance mode, the system 100 determines that the map matching function used for the normal operation of the navigation application 131 is insufficient for safe and stable autonomous travel. Specifically, the route 809 is not localized with the level of precision required to support safe and stable autonomous vehicle. For example, the route 809 may be based on prior raw sensor readings, an off-the-shelf localizer, or a combination thereof. Consequently, in one embodiment, the system 100 localizes the vehicle pose on the digital map as described above, as depicted by the route 809' relative to the route 809. Specifically, in this instance the route 809' is now localized in terms of the lateral lanes of road 805 to keep the vehicle 101 in the center of the lane.

Figure 9:
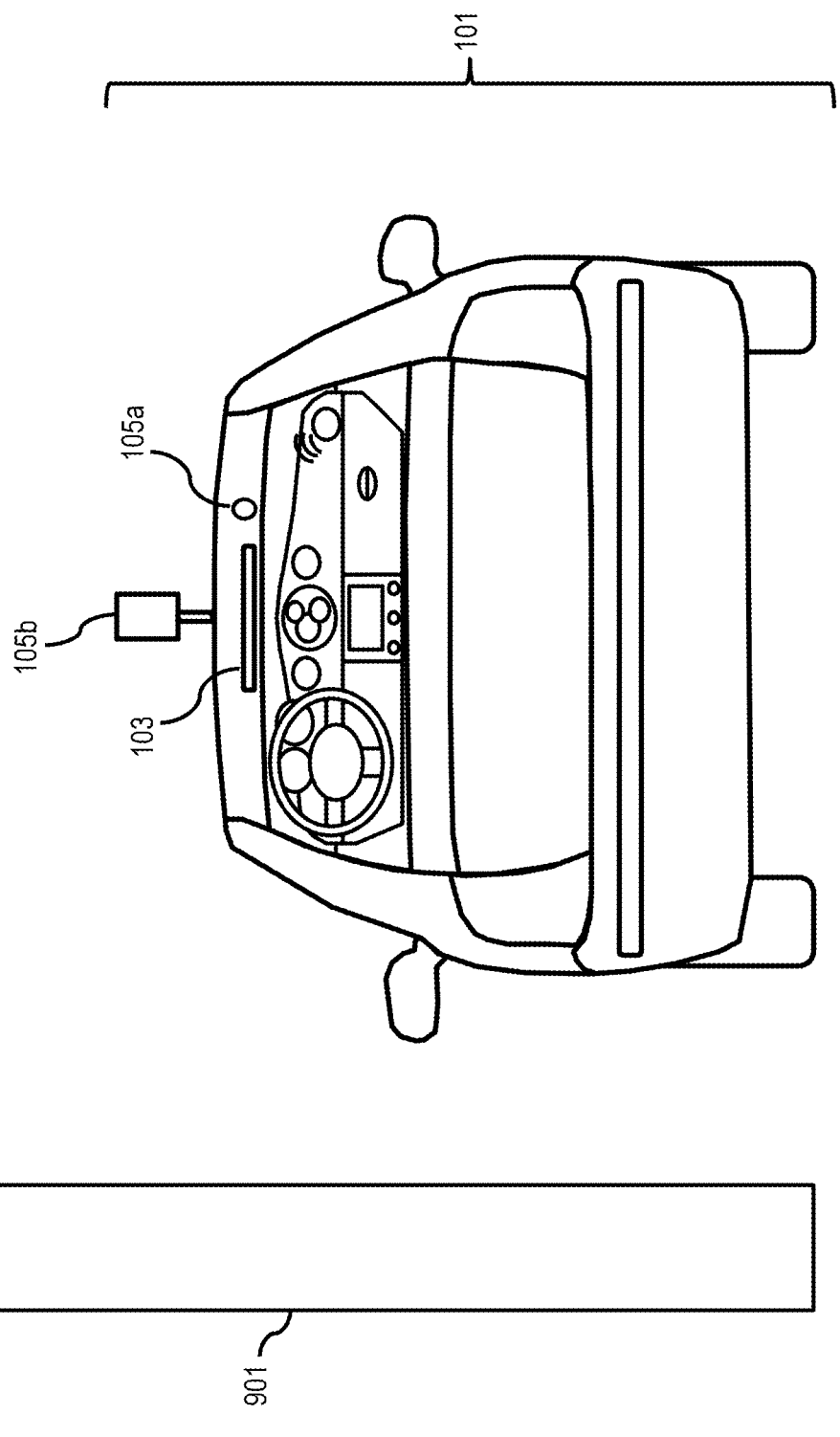
FIG. 9 is a diagram illustrating a vehicle equipped with sensors to support localizing a vehicle pose on a map, according to one embodiment.

FIG. 9 is a diagram illustrating an example of a vehicle 101 equipped with sensors to support the collection of training or ground truth data to formulate the localization problem as a linear-search technique that uses the EM framework to solve for the lateral offsets to the map (e.g., the digital map 111), the heading of the vehicle (e.g., the vehicle 101), and the longitudinal position of the vehicle 101, according to one embodiment. As shown, the vehicle 101 is equipped with a location sensor 103 (e.g., a GPS receiver) and other sensors 105 such as but not limited to a camera sensor 105a and LiDAR sensor 105b. As the vehicle 101 travels in the area being surveyed (e.g., lane 109), the vehicle 101 can initiate the capture of location data from the location sensor 103, image data from the camera sensor 105a, and three-dimensional mesh data from the LiDAR sensor 105b. The location data (e.g., vehicle pose data comprising location and/or direction) can be collected with typical consumer-grade location sensors (e.g., a single GPS receiver versus multiple receivers that generate differential GPS readings) that are susceptible to potential systematic errors. As discussed above, the systematic errors can be caused by multipath reflections from structures, buildings, terrain, etc. (e.g., structure 901 as shown in FIG. 9). The captured sensor data can then be timestamped with the collection time to generate a data record representing the capture data. For example, the data record (e.g., a probe point) can include but is not limited to the following data fields: <time of collection>, <location/vehicle pose data>, <image data>, <LiDAR mesh data>. As the vehicle 101 drives and collects probe data (e.g., sensor data) in the geographic areas of interest, the probe or sensor data can be collected by the feature extraction module 409 of the mapping platform 119 to use as training data.

To address these limitations, the feature extraction module 409 can automatically generate ground truth data (e.g., reference/ground truth line 221) using more compute-intensive localizers that can perform more accurate sensor fusion (e.g., fusion of the pose data, image data, mesh data, and/or any other collected sensor data) to localize the vehicle 101 with greater accuracy. Because compute-intensive localizers use sensor fusion algorithms that require significant computational resources and time, these types of localizers are generally executed in a batch or offline mode (e.g., on a cloud-based cluster), as opposed to use in real-time applications. Accordingly, in one embodiment, the raw sensor data (e.g., sensor readings 201-217 of FIG. 2) is first collected. Then, for each drive in the region or area interest, the feature extraction module 409 can run the compute-intensive localizer in, for instance, a grid-like pattern for each vehicle pose point to identify the corrected vehicle pose. In one embodiment, the computing resources needed by the compute-intensive localizer can vary with the grid-size (e.g., smaller grid sizes with more grid cells require more compute resources). Accordingly, the grid-size can be specified based on the available computing resources.

In one embodiment, the training or ground truth data set can include streams from other data sources such as digital map data (e.g., HD maps of the geographic database 117). For example, with respect to location sensors 103, the structural features (e.g., buildings, structures, etc.) or terrain can have potential correlation with sensor error (e.g., structures causing multipath interference of GPS sensors and thereby reducing their accuracy). Accordingly, in one embodiment, the feature extraction module 409 can query the geographic database 117 for map data corresponding to the respective location of the probe points in the training data set. The map data then represents yet another data stream. In yet another embodiment, other types of data can also be included in the training data set such as but not limited to weather data, sensor type, sensor manufacturer, vehicle characteristics, etc.

In one embodiment, the feature extraction process also comprises converting the feature data into a format suitable for input into the machine learning model 123. For example, the features or data items can be converted into an input vector or matrix for training the by the machine learning model 123. Other examples of feature conversion can include but is not limited to: converting a text label to a Boolean flag; converting text labels to categorical labels; converting dates/times to a standardized format; normalizing or converting the extracted feature data into a common taxonomy or dictionary of terms; etc.

As illustrated above, the training or ground truth data may include any number of features or characteristics of the raw sensor data (e.g., sensor readings 201-217) and related information. However, some of the features may not correlate well or at all with sensor error of the target sensor. Including such features in ground truth training data, therefore, would not increase or contribute to the predictive power of the machine learning model 123. Accordingly, in one embodiment, the feature extraction module 409 can further process the ground truth data to extract or select one or more training features. In one embodiment, the feature extraction module 409 can use any statistical method known in the art (e.g., Principal Component Analysis (PCA) and Univariate Selection) to select the best correlated features to localize the vehicle pose on a map. In other words, the feature extraction module 409 extracts the training features from the ground truth data by first determining a set of candidate features. The mapping platform 119 then selects the training features from among the set of candidate features (e.g., lateral, longitudinal, and heading) based on a calculated correlation of the candidate features to localizing a vehicle pose on a digital map (i.e., localization components).

Returning to FIG. 1, in one embodiment, the mapping platform 119 has connectivity over a communication network 125 to the services platform 127 (e.g., an OEM platform) that provides one or more services 129a-129n (collectively referred to herein as services 129)(e.g., sensor data collection services). By way of example, the services 129 may also be other third-party services and include mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 127 uses the output (e.g. vehicle localization) of the machine learning model 123 to provide services such as navigation, mapping, other location-based services, etc.

In one embodiment, the mapping platform 119 may be a platform with multiple interconnected components and may include multiple servers, intelligent networking devices, computing devices, components and corresponding software for localizing a vehicle pose on a map. In addition, it is noted that the mapping platform 119 may be a separate entity of the system 100, a part of the one or more services 129, a part of the services platform 127, or included within the vehicle 101 (e.g., as a mapping module 121).

In one embodiment, content providers 131a-131m (collectively referred to as content providers 131) may provide content or data (e.g., including geographic data, sensor data, etc.) to the geographic database 117, the mapping platform 119, the services platform 127, the services 129, and the vehicle 101. The content provided may be any type of content, such as map content, textual content, audio content, video content, image content, etc. In one embodiment, the content providers 131 may provide content that may aid in localizing a vehicle pose on a map. In one embodiment, the content providers 131 may also store content associated with the geographic database 117, mapping platform 119, mapping module 121, services platform 127, services 129, and/or vehicle 101. In another embodiment, the content providers 131 may manage access to a central repository of data, and offer a consistent, standard interface to data, such as a repository of the geographic database 117.

By way of example, the mapping module 121 and/or the UE 113 can be any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the mapping module 121 and/or the UE 113 can support any type of interface to the user (such as "wearable" circuitry, etc.). In one embodiment, the mapping module 121 and/or the UE 113 may be associated with the vehicle 101 or be a component part of the vehicle 101.

In one embodiment, as previously stated, the vehicle 101 is configured with various sensors (e.g., location sensors 103 and/or other sensors 107) for generating or collecting vehicular sensor data, related geographic/map data, etc. In one embodiment, the sensed data represents sensor data associated with a geographic location or coordinates at which the sensor data was collected. In this way, the sensor data can act as observation data that can be aggregated into location-aware training and evaluation data sets. By way of example, the sensors 103/107 may include a RADAR system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on a steering wheel of the vehicle 101, switch sensors for determining whether one or more vehicle switches are engaged, and the like.

Other examples of sensors 107 of the vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle 101 along a path of travel, moisture sensors, pressure sensors, etc. In a further example embodiment, sensors 107 about the perimeter of the vehicle 101 may detect the relative distance of the vehicle 101 from a physical divider, a lane 109 or roadway, the presence of other vehicles, pedestrians, traffic lights, potholes and any other objects, or a combination thereof. In one scenario, the sensors 107 may detect weather data, traffic information, or a combination thereof. In one embodiment, the vehicle 101 may include GPS or other satellite-based receivers 103 to obtain geographic coordinates from satellites 105 for determining current location and time. Further, the location can be determined by visual odometry, triangulation systems such as A-GPS, Cell of Origin, or other location extrapolation technologies. In yet another embodiment, the sensors 107 can determine the status of various control elements of the vehicle 101, such as activation of wipers, use of a brake pedal, use of an acceleration pedal, angle of the steering wheel (i.e., heading), activation of hazard lights, activation of head lights, etc.

In one embodiment, the communication network 125 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the vehicle 101, mapping platform 119, services platform 127, services 129, and/or content providers 131 communicate with each other and other components of the system 100 using well known, new or still developing protocols. In this context, a protocol includes a set of rules defining how the network nodes within the communication network 125 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 10:
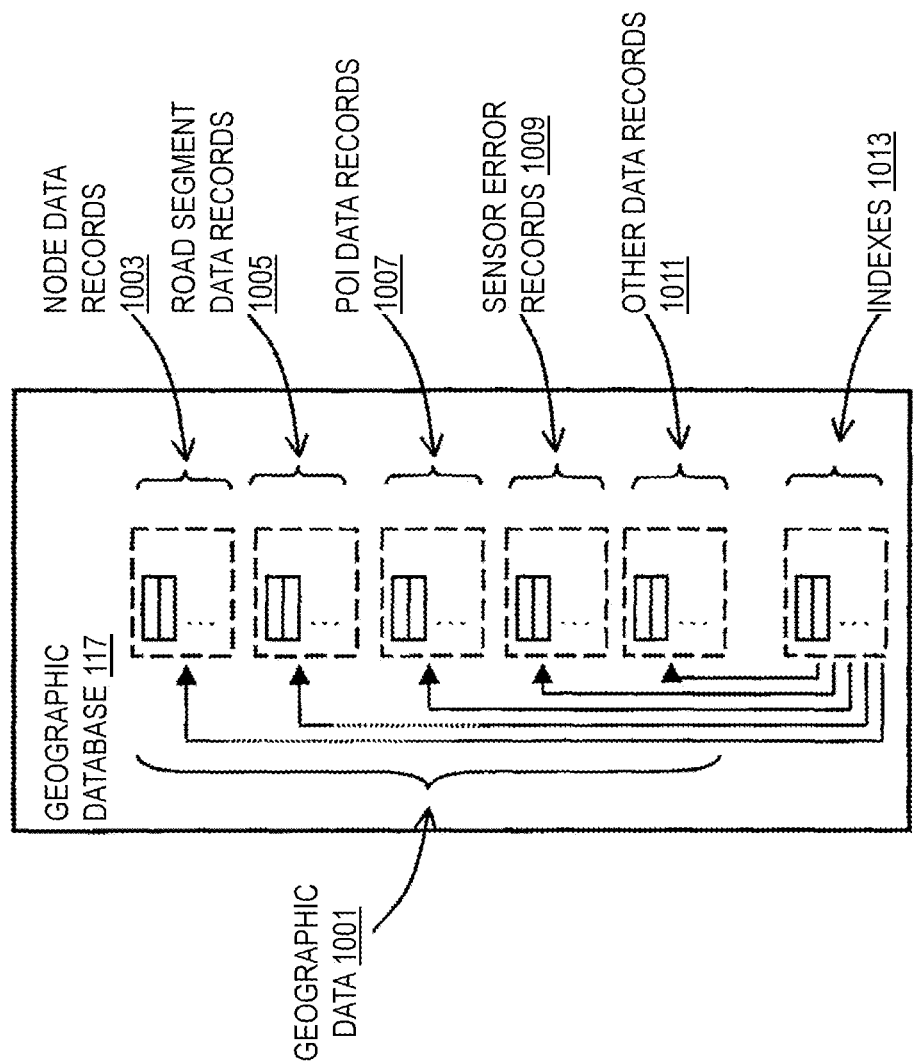
FIG. 10 is a diagram of a geographic database, according to one embodiment.

FIG. 10 is a diagram of a geographic database, according to one embodiment. In one embodiment, the geographic database 117 includes geographic data 1001 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the geographic database 117 includes high resolution or high definition (HD) mapping data that provides centimeter-level or better accuracy of map features. For example, the geographic database 117 can be based on Light Detection and Ranging (LiDAR) or equivalent technology to collect billions of 3D points and model road surfaces, structures, buildings, terrain, and other map features down to the number lanes and their widths. In one embodiment, the HD mapping data capture and store details such as the slope and curvature of the road, parking spots, lane markings, roadside objects such as sign posts, including what the signage denotes, etc. By way of example, the HD mapping data enable HAD vehicles to precisely localize themselves on the lane or road (e.g., lane 109), and to determine road attributes (e.g., learned speed limit values) to at high accuracy levels.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably. In one embodiment, the following terminology applies to the representation of geographic features in the geographic database 117.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non-reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island).

In one embodiment, a polygon is constructed from one outer simple polygon and none or at least one inner simple polygon. A polygon is simple if it just consists of one simple polygon, or complex if it has at least one inner simple polygon.

In one embodiment, the geographic database 117 follows certain conventions. For example, links do not cross themselves and do not cross each other except at a node. Also, there are no duplicated shape points, nodes, or links. Two links that connect each other have a common node. In the geographic database 117, overlapping geographic features are represented by overlapping polygons. When polygons overlap, the boundary of one polygon crosses the boundary of the other polygon. In the geographic database 117, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 117 includes node data records 1003, road segment or link data records 1005, POI data records 1007, sensor error records 1009, other records 1011, and indexes 1013, for example. More, fewer or different data records can be provided. In one embodiment, additional data records (not shown) can include cartographic ("carto") data records, routing data, and maneuver data. In one embodiment, the indexes 1013 may improve the speed of data retrieval operations in the geographic database 117. In one embodiment, the indexes 1013 may be used to quickly locate data without having to search every row in the geographic database 117 every time it is accessed. For example, in one embodiment, the indexes 1013 can be a spatial index of the polygon points associated with stored feature polygons.

In exemplary embodiments, the road segment data records 1005 are links or segments representing roads, streets, or paths, as can be used in the calculated route or recorded route information for determination of one or more personalized routes. The node data records 1003 are end points corresponding to the respective links or segments of the road segment data records 1005. The road link data records 1005 and the node data records 1003 represent a road network, such as used by vehicles, cars, and/or other entities. Alternatively, the geographic database 117 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 117 can include data about the POIs and their respective locations in the POI data records 1007. The geographic database 117 can also include data about places, such as cities, towns, or other communities, and other geographic features, such as bodies of water, mountain ranges, etc. Such place or feature data can be part of the POI data records 1007 or can be associated with POIs or POI data records 1007 (such as a data point used for displaying or representing a position of a city).

In one embodiment, the geographic database 117 can also include sensor error records 1009 for storing location sensor error data, sensor error priors, and/or related data. The location data, for instance, can be stored as attributes or data records of a sensor error data layer or overlay of the geographic database 117, which fuses the location attributes with map attributes or features. In one embodiment, the sensor error records 1009 can be associated with segments of a road link (as opposed to an entire link). It is noted that the segmentation of the road for the purposes of sensor error can be different than the road link structure of the geographic database 117. In other words, the segments can further subdivide the links of the geographic database 117 into smaller segments (e.g., of uniform lengths such as 5-meters). In this way, sensor error (e.g., lateral or longitudinal offset) can be represented at a level of granularity that is independent of the granularity or at which the actual road or road network is represented in the geographic database 117. In one embodiment, the sensor error records 1009 can be associated with one or more of the node records 1003, road segment records 1005, and/or POI data records 1007; or portions thereof (e.g., smaller or different segments than indicated in the road segment records 1005) to provide greater localization accuracy/speed and provide for safer autonomous operation of vehicles (e.g., vehicle 101). In this way, the location sensor error data stored in the sensor error records 1009 can also be associated with the characteristics or metadata of the corresponding records 1003, 1005, and/or 1007.

In one embodiment, the geographic database 117 can be maintained by the content providers 131 in association with the services platform 127 (e.g., a map developer). The map developer can collect geographic data to generate and enhance the geographic database 117. There can be different ways used by the map developer to collect data. These ways can include obtaining data from other sources, such as municipalities or respective geographic authorities. In addition, the map developer can employ field personnel to travel by vehicle along roads throughout the geographic region to observe features (e.g., physical dividers, OPPO, VRU, etc.) and/or record information about them, for example. Also, remote sensing, such as aerial or satellite photography, can be used.

The geographic database 117 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for localizing a vehicle pose on a map may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
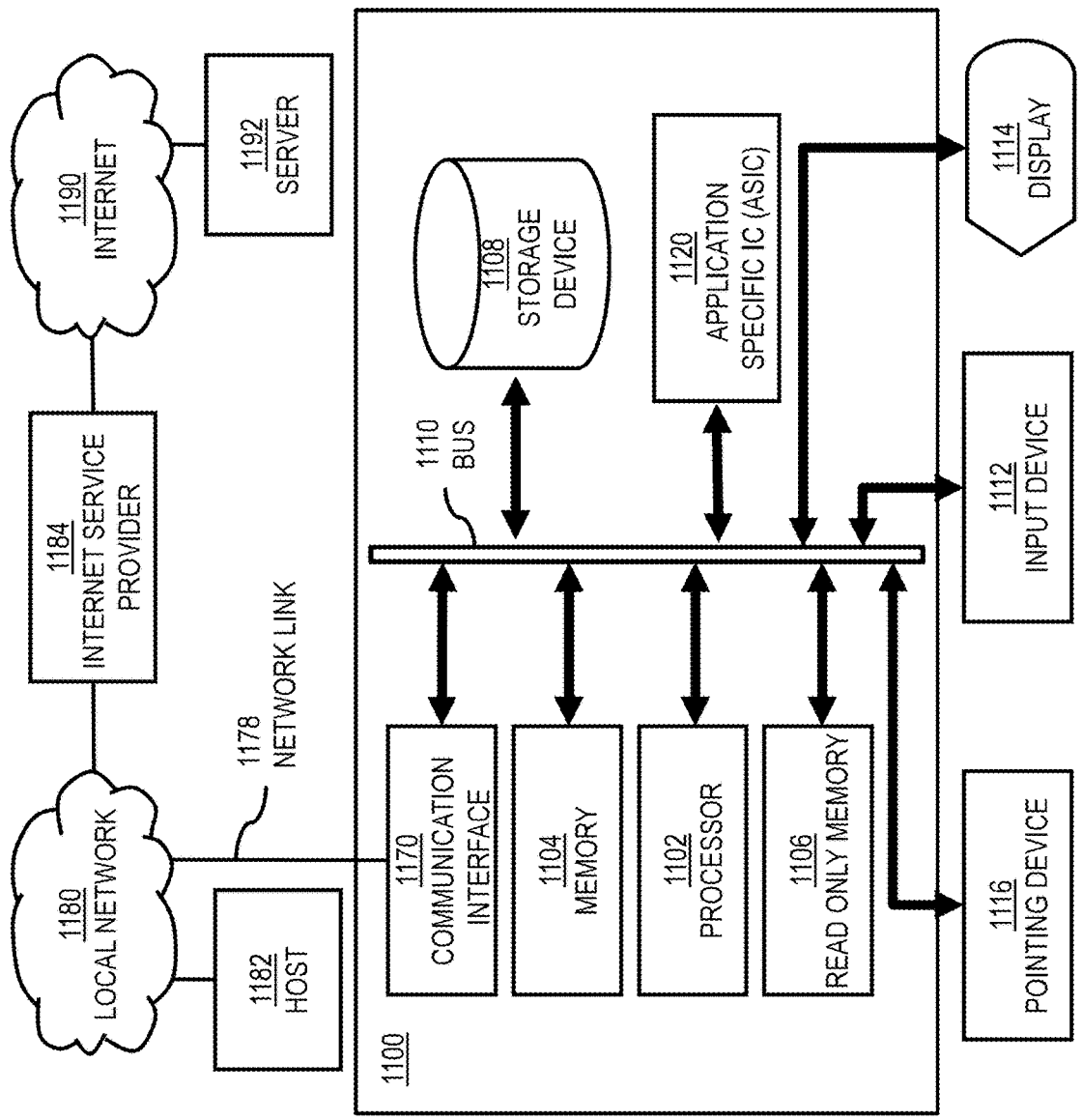
FIG. 11 is a diagram of hardware that can be used to implement an embodiment of the invention.

FIG. 11 illustrates a computer system 1100 upon which an embodiment of the invention may be implemented. Computer system 1100 is programmed (e.g., via computer program code or instructions) to localize a vehicle pose on a map as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to localizing a vehicle pose on a map. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random-access memory (RAM) or other dynamic storage device, stores information including processor instructions for localizing a vehicle pose on a map. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for localizing a vehicle pose on a map, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general, the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 125 for localizing a vehicle pose on a map.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 12 illustrates a chip set 1200 upon which an embodiment of the invention may be implemented. Chip set 1200 is programmed to localize a vehicle pose on a map as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to localize a vehicle pose on a map. The memory 1205 also stores the data associated with or generated by the execution of the inventive steps.

Figure 13:
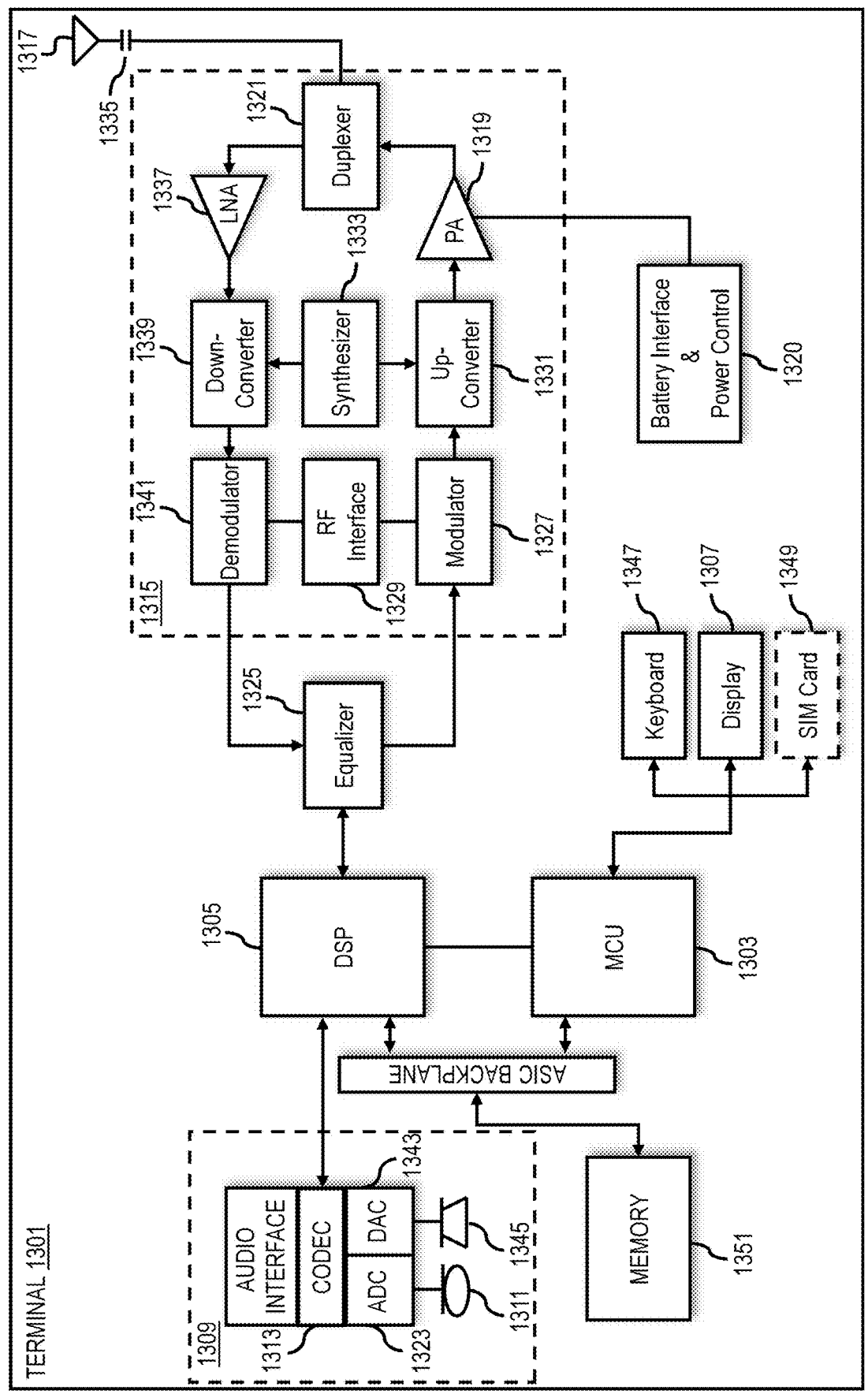
FIG. 13 is a diagram of a mobile terminal (e.g., handset or vehicle or part thereof) that can be used to implement an embodiment of the invention.

FIG. 13 is a diagram of exemplary components of a mobile terminal 1301 (e.g., handset or vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to localize a vehicle pose on a map. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for localizing a vehicle pose on a map comprising:
   receiving an input specifying the vehicle pose with respect to a road lane of the map, wherein the vehicle pose includes a vehicle position and a vehicle heading;
   searching over a set of candidate lateral offsets of possible vehicle poses to select and apply a lateral offset that minimizes a lateral error between the vehicle position with the lateral offset applied and a lateral location of the road lane, wherein the lateral offset and lateral error are lateral to a travel direction of the lane, and wherein the lateral location and the travel direction of the lane are determined from map data of a geographic database;
   searching over a set of candidate vehicle headings at the selected lateral offset to select a vehicle heading that minimizes a heading error between the vehicle heading and the travel direction of the lane; and
   determining a local optimum of the vehicle pose based on the selected lateral offset and the selected vehicle heading,
   wherein the vehicle pose is localized to the map based on the local optimum.

2. The method of claim 1, further comprising:
   iterating between the searching over the set of candidate lateral offsets and the searching over the set of candidate vehicle headings to minimize the lateral error and the heading error.

3. The method of claim 2, wherein the iterating is performed until a convergence criterion is met.

4. The method of claim 3, wherein the convergence criterion includes a maximum number of iterations, a target error level, or a combination thereof.

5. The method of claim 1, further comprising:
   searching over a set of candidate longitudinal offsets, wherein a respective set of candidate lateral offsets and a respective set of candidate vehicle headings are searched over at each candidate longitudinal offset to determine a respective set of local optima of the vehicle pose; and
   selecting a longitudinal offset from the set of candidate longitudinal offsets that corresponds to a global optimum from among the respective set of local optima that minimizes the lateral error, the vehicle heading error, a longitudinal error, or a combination thereof,
   wherein the vehicle pose is localized based on the global optima.

6. The method of claim 5, wherein the input includes an ordered set of a vehicle poses, and wherein the global optimum is determined with respect to the ordered set of vehicle poses.

7. The method of claim 6, further comprising:
   reversing the ordered set of the vehicle poses; and
   determining a quality of the global optimum based on an ambiguity of the global optimum as a solution to the ordered set and the reversed ordered set.

8. The method of claim 5, further comprising:
   determining a trajectory based on the respective set of local optima; and
   constraining a localization of the vehicle pose based on the trajectory.

9. The method of claim 5, wherein the searching over the set of candidate lateral offsets, the searching over the set of candidate vehicle headings, searching over a set of candidate longitudinal offsets, or a combination thereof is based on a linear-search technique, an expectation-maximization framework, or a combination thereof.

10. The method of claim 1, wherein the input specifying the vehicle pose is based on an estimate of the vehicle pose, sensor data indicating the vehicle pose, or a combination thereof.

11. An apparatus for localizing a vehicle pose on a map, comprising:
    at least one processor; and
    at least one memory including computer program code for one or more programs,
    the at least one memory and the computer program code configured to, with the at least one processor, cause the apparatus to perform at least the following,
      search over a set of candidate lateral offsets for the vehicle to select and apply a lateral position that minimizes an error between a vehicle position with the lateral offset applied and a lateral location of the road lane, wherein the set of candidate lateral offsets is based on possible vehicle poses with respect to a road lane of determined map data of a geographic database;
      search over a set of candidate vehicle headings at the selected lateral offset to select a vehicle heading that minimizes a heading error between the vehicle heading and the travel direction of the lane;
      iterate between the set of candidate lateral offsets and the set of candidate vehicle headings until a convergence criterion is met; and
      determine a local optimum of the vehicle pose based on the meeting of the convergence criterion,
      wherein the vehicle pose is localized to the map based on the local optimum.

12. The apparatus of claim 11, wherein the apparatus is further caused to:

receive an input specifying the vehicle pose, wherein the vehicle pose includes a vehicle position and a vehicle heading.

13. The apparatus of claim 11, wherein the convergence criterion includes a maximum number of iterations, a target error level, or a combination thereof.

14. The apparatus of claim 11, wherein the apparatus if further caused to:

search over a set of candidate longitudinal offsets, wherein a respective set of candidate lateral offsets and a respective set of candidate vehicle headings are searched over at each candidate longitudinal offset to determine a respective set of local optima of the vehicle pose; and select a longitudinal offset from the set of candidate longitudinal offsets that corresponds to a global optimum from among the respective set of local optima that minimizes the lateral error, the vehicle heading error, a longitudinal error, or a combination thereof, wherein the vehicle pose is localized based on the global optima.

15. The apparatus of claim 14, wherein the input includes an ordered set of a vehicle poses, and wherein the global optimum is determined with respect to the ordered set of vehicle poses.

16. The apparatus of claim 15, wherein the apparatus if further caused to:

reverse the ordered set of the vehicle poses; and determine a quality of the global optimum based on an ambiguity of the global optimum as a solution to the ordered set and the reversed ordered set.

17. The apparatus of claim 14, wherein the apparatus if further caused to:

determine a trajectory based on the respective set of local optima; and constrain a localization of the vehicle pose based on the trajectory.

18. A non-transitory computer-readable storage medium for localizing a vehicle pose on a map, carrying one or more sequences of one or more instructions which, when executed by one or more processors, cause an apparatus to at least perform the following steps:

receiving an input specifying the vehicle pose with respect to a road lane of the map, wherein the vehicle pose includes a vehicle position and a vehicle heading;

searching over a set of candidate lateral offsets of possible vehicle poses to select and apply a lateral offset that minimizes a lateral error between the vehicle position with the lateral offset applied and a lateral location of the road lane, wherein the lateral offset and lateral error are lateral to a travel direction of the lane, and wherein the lateral location and the travel direction of the lane are determined from map data of a geographic database;

searching over a set of candidate vehicle headings at the selected lateral offset to select a vehicle heading that minimizes a heading error between the vehicle heading and the travel direction of the lane; and determining a local optimum of the vehicle pose based on the selected lateral offset and the selected vehicle heading, wherein the vehicle pose is localized to the map based on the local optimum.

19. The non-transitory computer-readable storage medium of claim 18, further comprising:

iterating between the searching over the set of candidate lateral offsets and the searching over the set of candidate vehicle headings to minimize the lateral error and the heading error.

20. The non-transitory computer-readable storage medium of claim 18, wherein the iterating is performed until a convergence criterion is met.

* * * * *